(12) United States Patent
Van Ostrand et al.

(10) Patent No.: US 11,269,436 B2
(45) Date of Patent: Mar. 8, 2022

(54) TOUCHSCREEN DISPLAY WITH CONCURRENT TOUCH AND DISPLAY OPERATIONS

(71) Applicant: SIGMASENSE, LLC., Wilmington, DE (US)

(72) Inventors: Daniel Keith Van Ostrand, Leander, TX (US); Michael Shawn Gray, Cedar Park, TX (US); Kevin Joseph Derichs, Buda, TX (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

(21) Appl. No.: 17/081,089

(22) Filed: Oct. 27, 2020

(65) Prior Publication Data

US 2021/0048909 A1 Feb. 18, 2021

Related U.S. Application Data

(63) Continuation of application No. 16/131,634, filed on Sep. 14, 2018, now Pat. No. 10,838,530.
(Continued)

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC combination set(s) only.
See application file for complete search history.

(56) References Cited

U.S. PATENT DOCUMENTS 6,218,972 B1 4/2001 Groshong
6,665,013 B1 12/2003 Fossum et al.
(Continued)

FOREIGN PATENT DOCUMENTS

CN 103995626 A 8/2014
CN 104182105 A 12/2014

OTHER PUBLICATIONS

Baker; How delta-sigma ADCs work, Part 1; Analog Applications Journal; Oct. 1, 2011; 6 pgs.
(Continued)

*Primary Examiner* — Robin J Mishler
(74) *Attorney, Agent, or Firm* — Garlick & Markison; Timothy W. Markison; Shayne X. Short

(57) ABSTRACT

A touchscreen display includes one or more display drivers coupled to an active matrix display and one or more touch controllers coupled to one or more touch sensor conductors. The one or more display drivers are coupled to the active matrix display via active matrix conductive components. When enabled, the one or more display drivers is configured to transmit a first signal to the active matrix display in accordance with display operation. A touch sensor conductor includes one or more segments of the active matrix conductive components. When enabled, a touch controller of the one or more touch controllers is configured to transmit a second signal via the touch sensor conductor in accordance with touchscreen operation that is performed concurrently with the display operation.

20 Claims, 28 Drawing Sheets

Touch controller channels capacitively coupled to selected Active Matrix rows and columns.

Related U.S. Application Data

(60) Provisional application No. 62/559,282, filed on Sep. 15, 2017.

(52) U.S. Cl.
CPC .......... *G06F 3/0443* (2019.05); *G06F 3/0445* (2019.05); *G06F 3/0446* (2019.05); *G06F 3/04164* (2019.05); *G06F 3/04166* (2019.05); *G06F 3/041662* (2019.05); *G06F 2203/04104* (2013.01)

(56) References Cited

U.S. PATENT DOCUMENTS

| | | | |
|---|---|---|---|
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,547,114 | B2 | 10/2013 | Kremin |
| 8,587,535 | B2 | 11/2013 | Oda et al. |
| 8,625,726 | B2 | 1/2014 | Kuan et al. |
| 8,982,097 | B1 | 3/2015 | Kuzo et al. |
| 9,201,547 | B2 | 12/2015 | Elias |
| 2011/0063154 | A1 | 3/2011 | Hotelling et al. |
| 2011/0298745 | A1 | 12/2011 | Souchkov |
| 2012/0278031 | A1 | 3/2012 | Sugiyama |
| 2013/0278447 | A1 | 10/2013 | Kremin |
| 2014/0132560 | A1 | 5/2014 | Huang et al. |
| 2014/0327644 | A1 | 11/2014 | Mohindra |
| 2015/0049041 | A1 | 2/2015 | Yousefpor |
| 2015/0091847 | A1 | 4/2015 | Chang |
| 2015/0346889 | A1 | 12/2015 | Chen et al. |
| 2016/0188049 | A1 | 6/2016 | Yang et al. |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

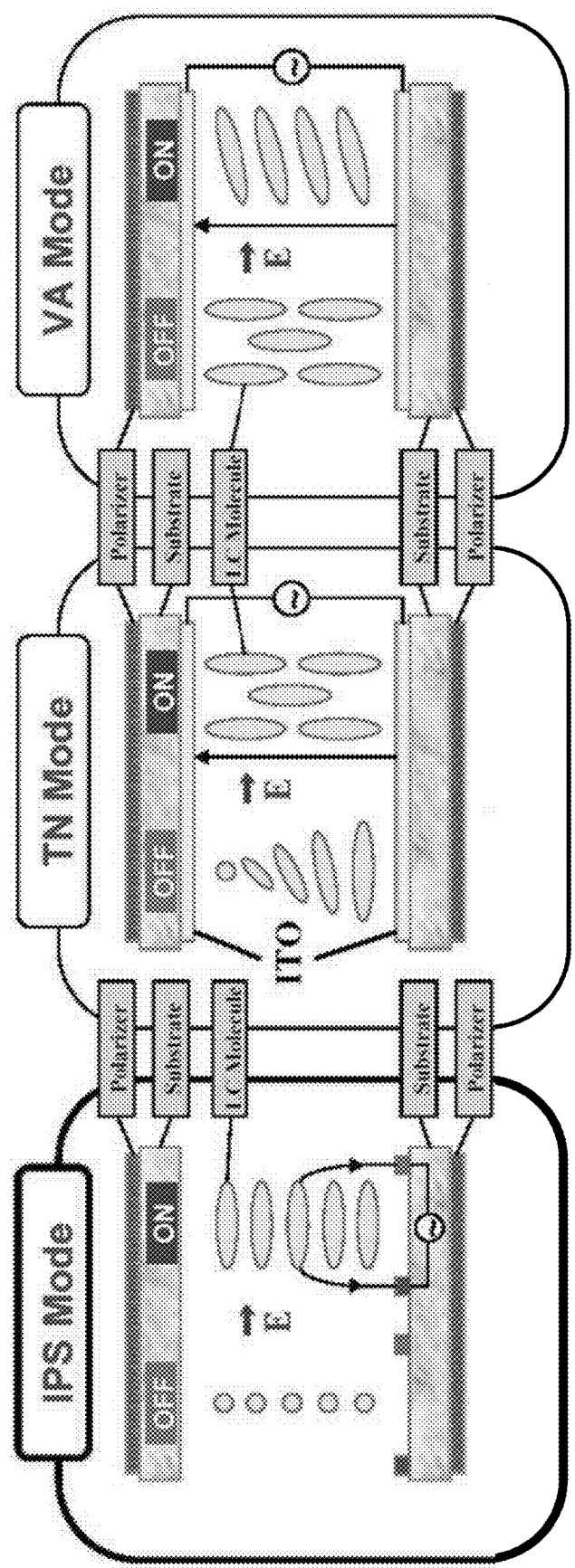
FIG. 1: IPS mode LCD displays generally require no ground plane conductor between the active matrix TFT layer and the viewer.

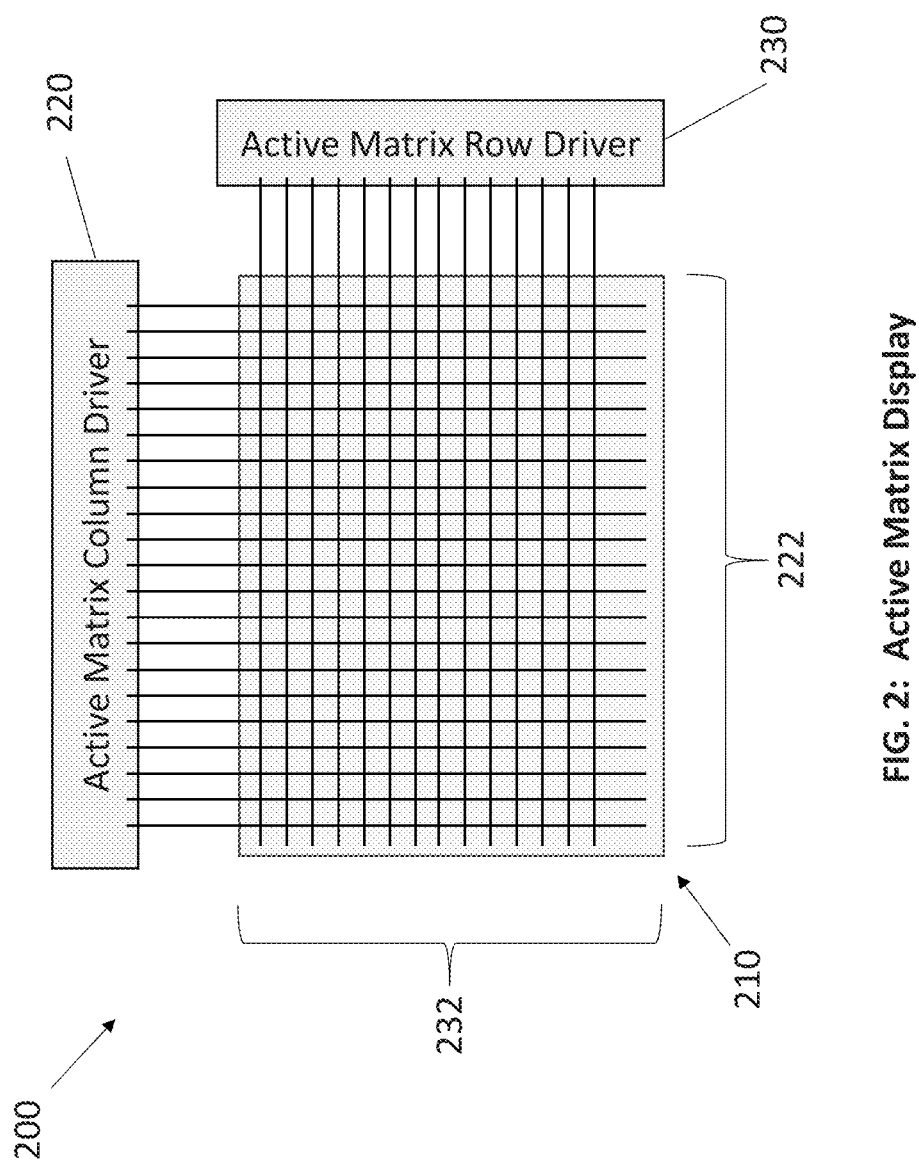
FIG. 2: Active Matrix Display

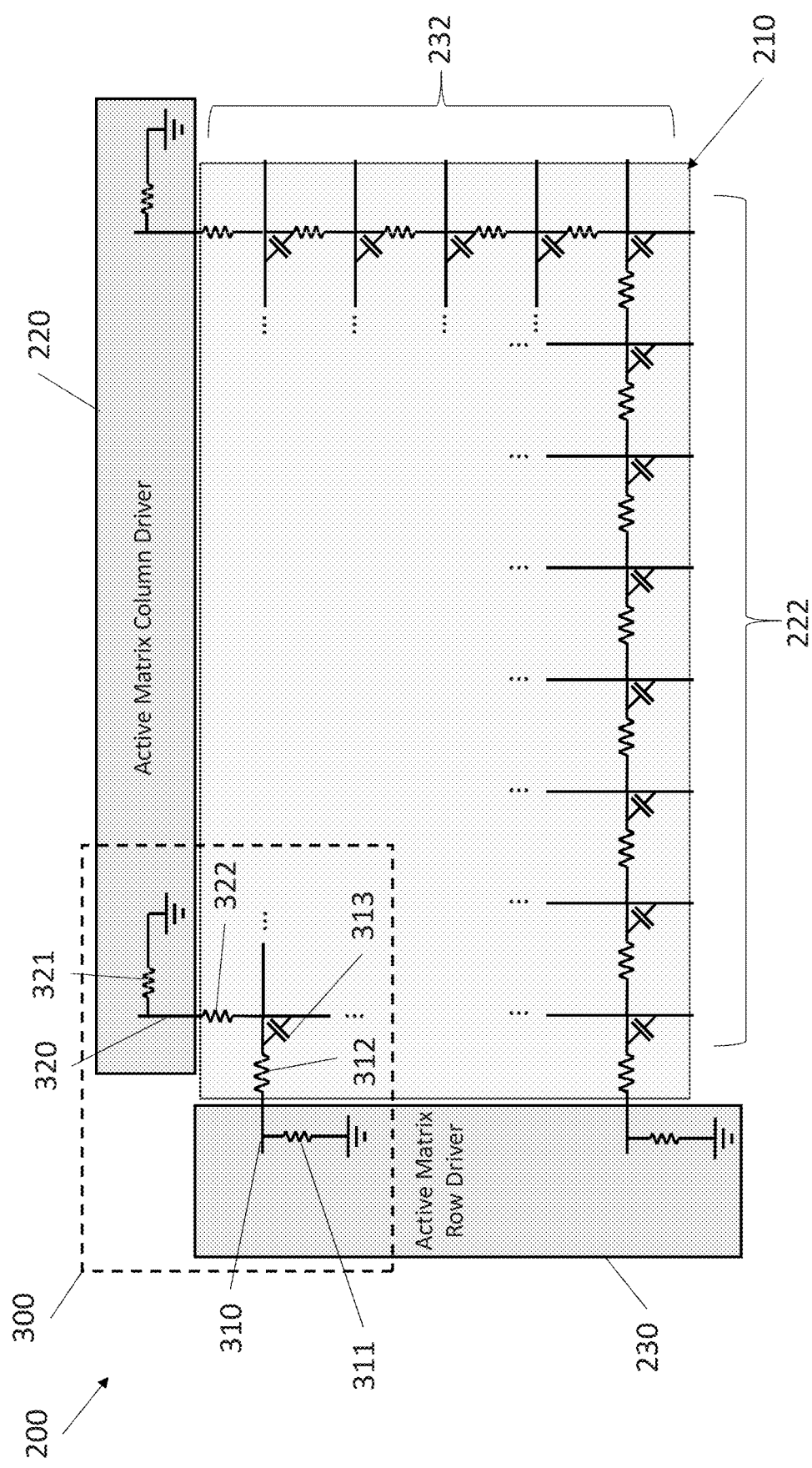
FIG. 3: Active Matrix Display showing the trace resistance and parasitic capacitance from the crossover of the row and column conductors. Path to ground for each conductor is through the Driver.
(note: no circuitry that normally exists at each pixel is shown)

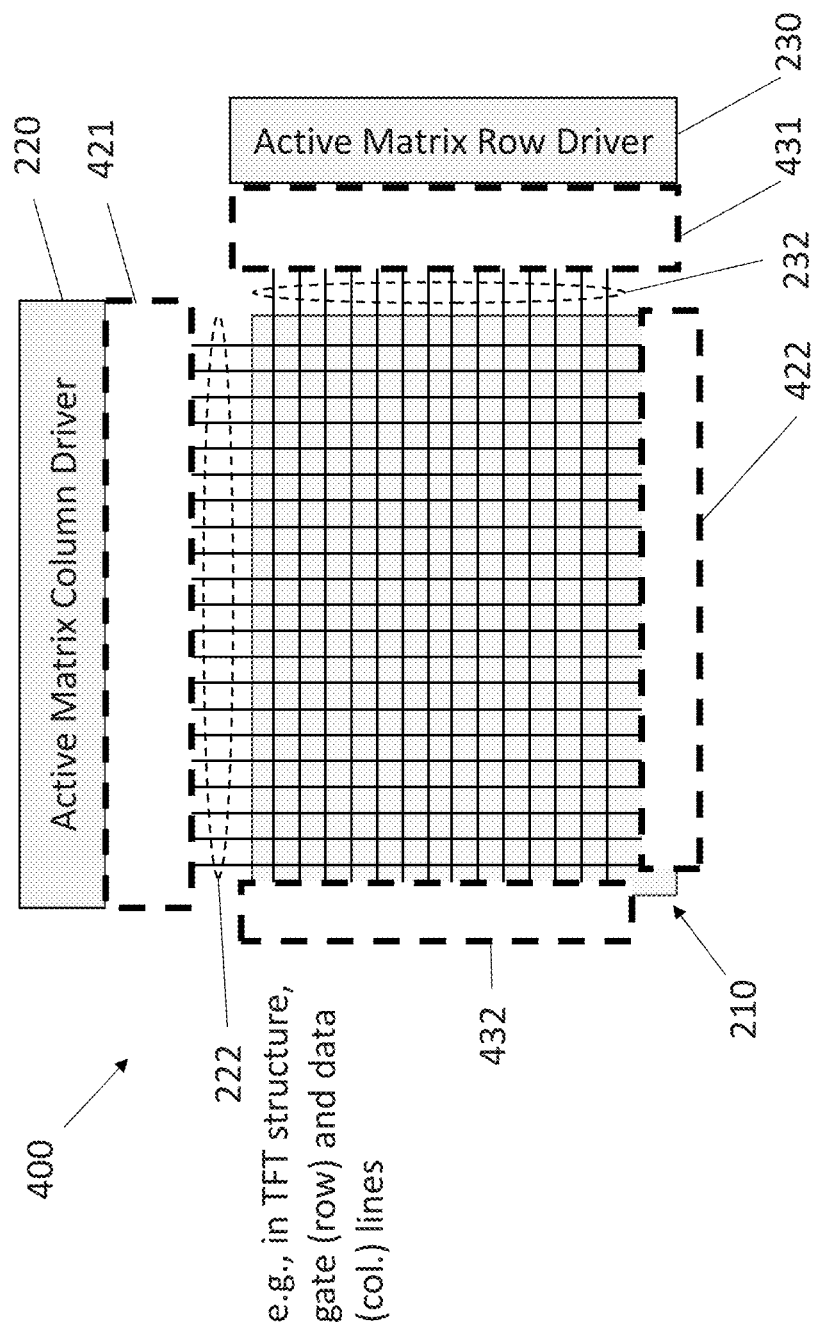
FIG. 4A: Active Matrix Display showing coupling locations for touch controller.

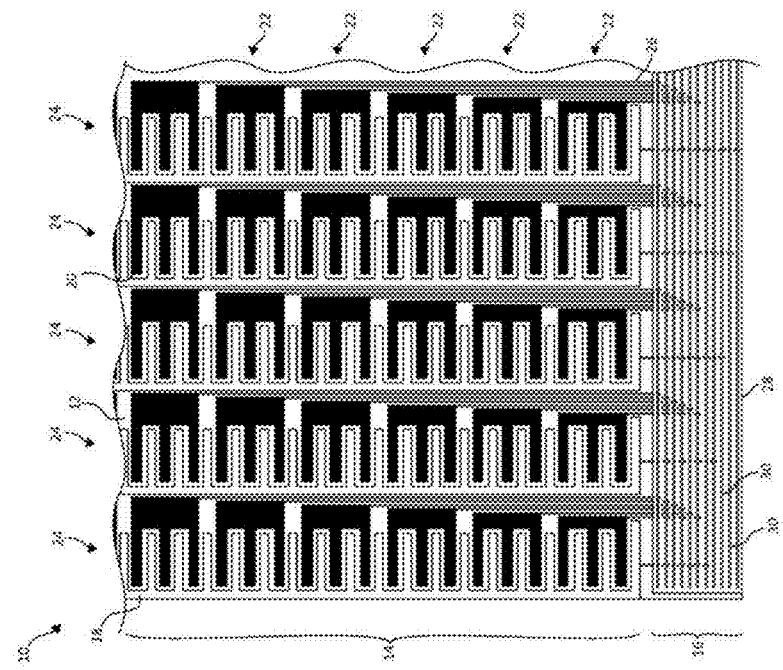
Prior Art from Patent Application: US20120227259 A1
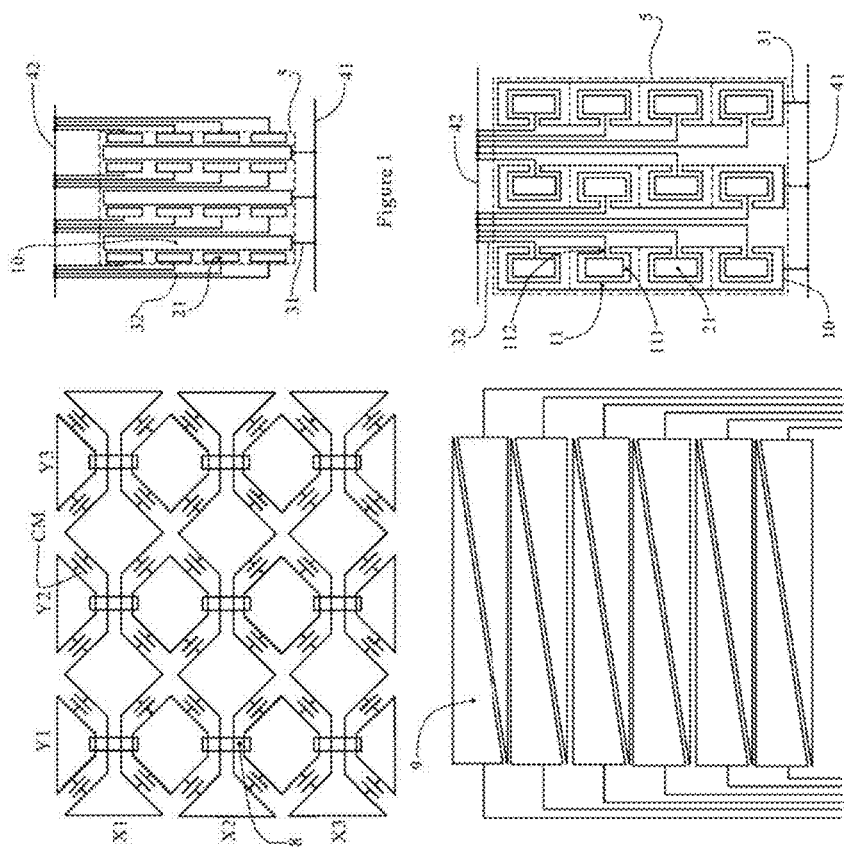
Prior Art from Patent Application: US20140168536 A1
FIG. 4B: Conductive pathways need not be orthogonal (as shown) and may be in single or multiple layers.

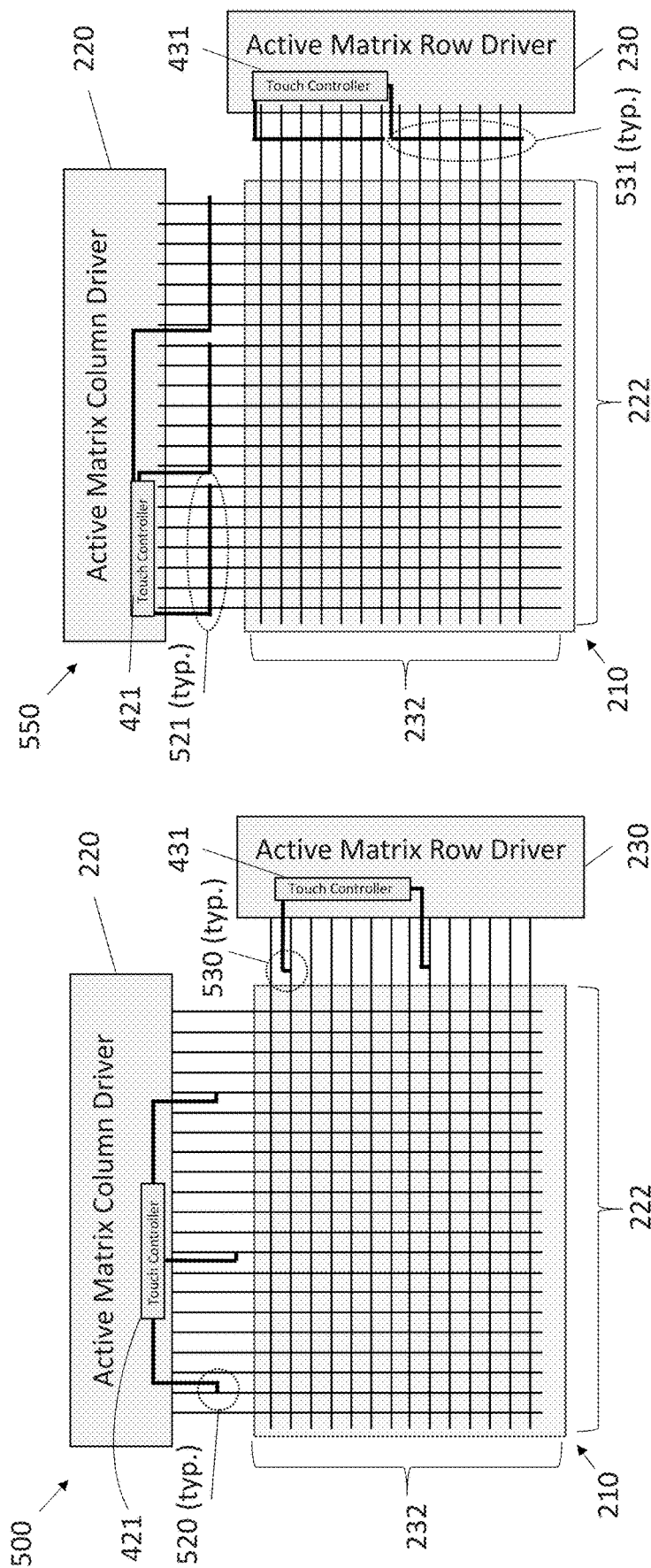
FIG. 5A: Touch controller channels directly coupled to selected Active Matrix rows and columns.
FIG. 5B: Touch controller channels capacitively coupled to selected Active Matrix rows and columns.

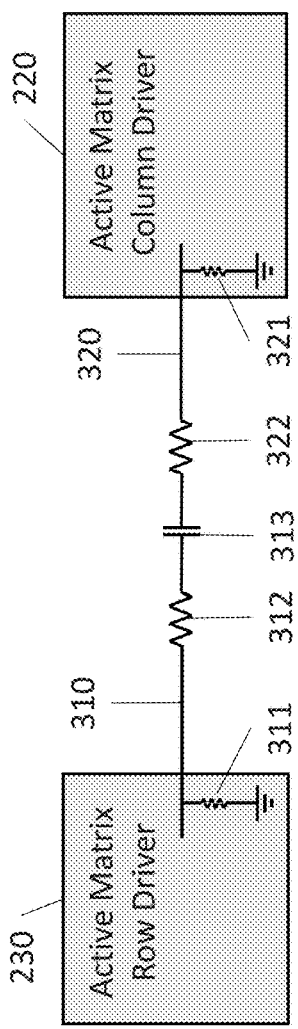
FIG. 6B: Equivalent drawing of a single crossover of conductors (a row and a column) within an Active Matrix.
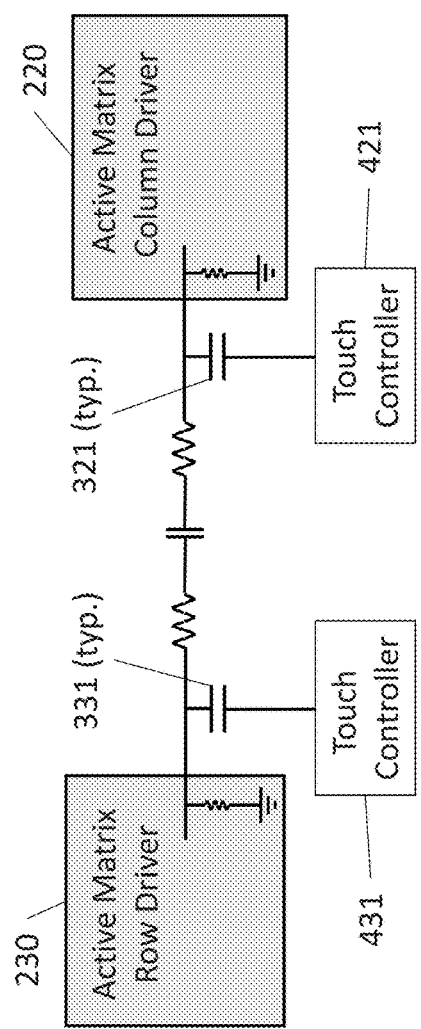
FIG. 6C: The capacitive coupling of the Touch Controller to the conductors (a row and a column) within an Active Matrix.
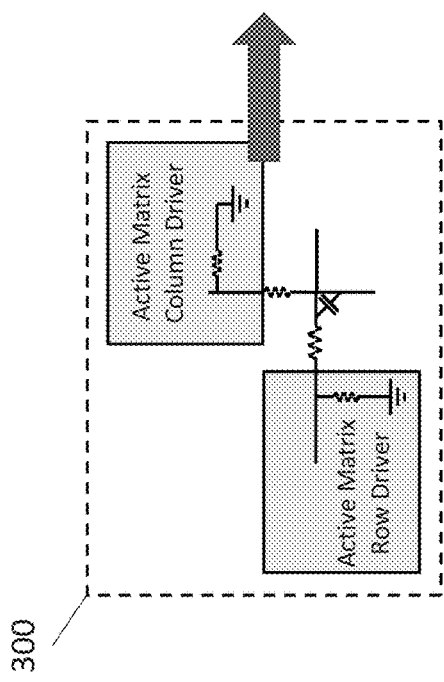
FIG. 6A: Single crossover of conductors (a row and a column) within an Active Matrix.

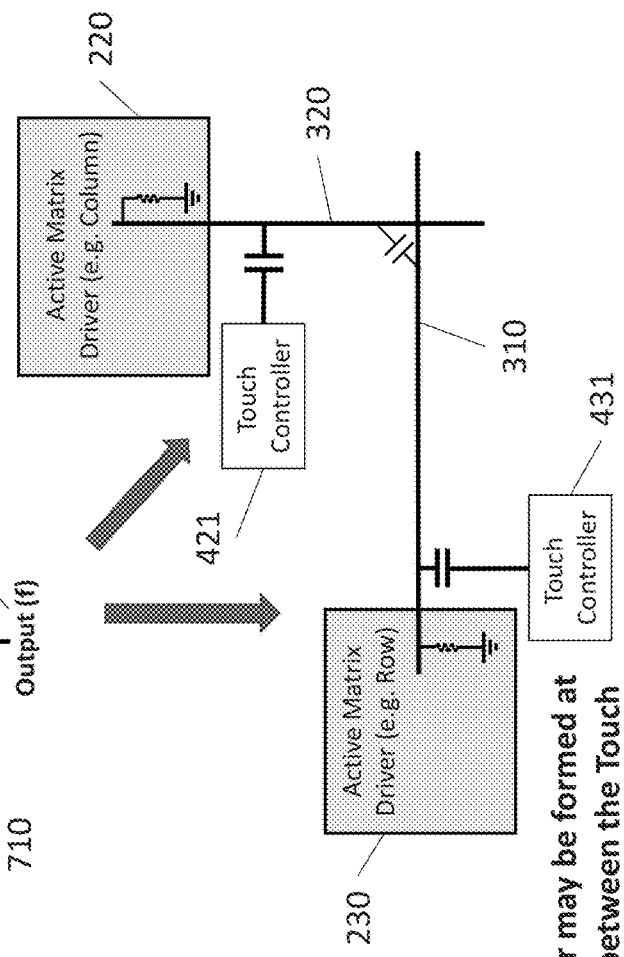
FIG. 7B: Capacitively coupling the Touch Controller to the Active Matrix forms a High-Pass filter.
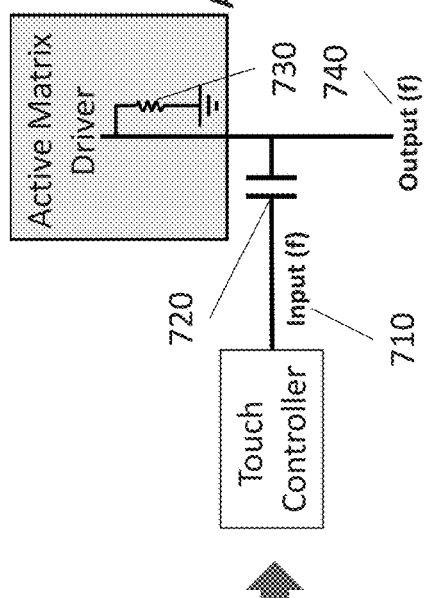
FIG. 7A: Definition of a High-Pass filter.
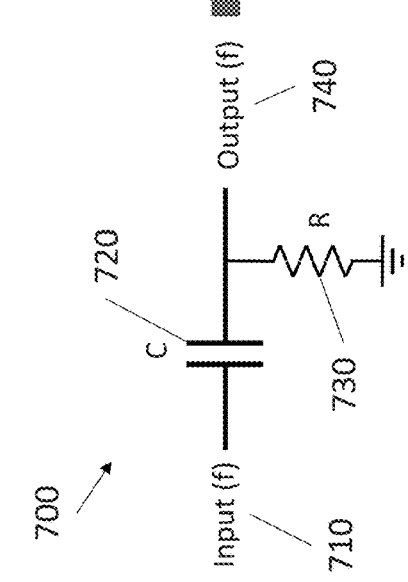
FIG. 7C: A High-Pass filter may be formed at all capacitive couplings between the Touch Controller and the Active Matrix.

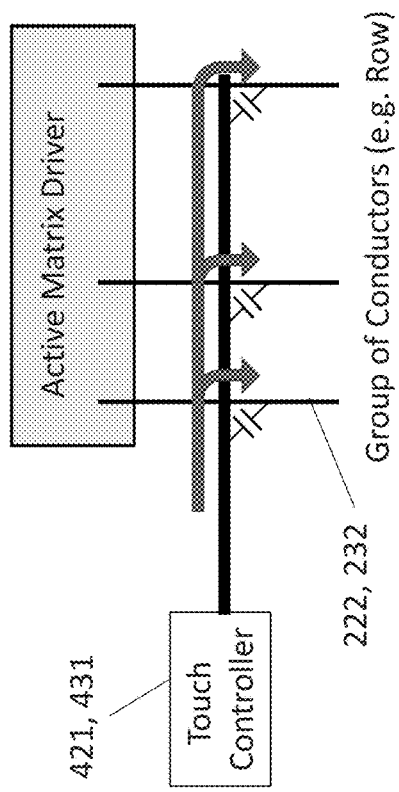
FIG. 8B: A single Touch Controller channel may be coupled to multiple Active Matrix conductors. Each coupling forms a High-Pass Filter.
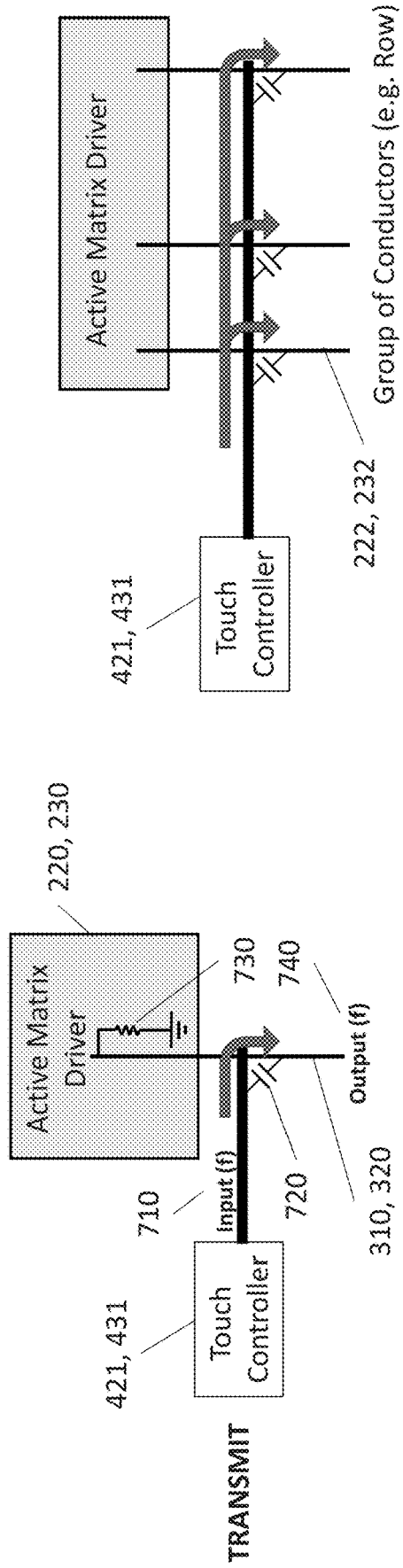
FIG. 8A: When the Touch Controller generates a transmit signal it passes through the High-Pass filter formed by the coupling between the Touch Controller and the Active Matrix.

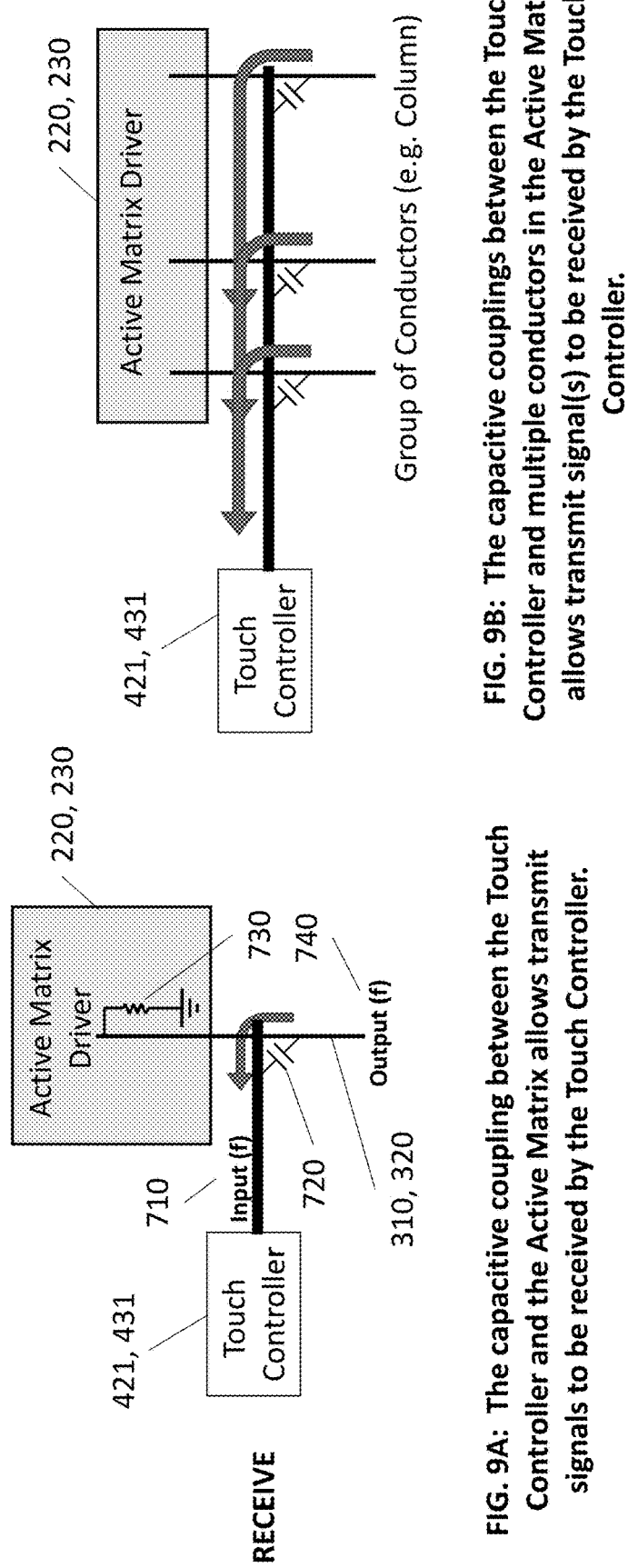
FIG. 9A: The capacitive coupling between the Touch Controller and the Active Matrix allows transmit signals to be received by the Touch Controller.
FIG. 9B: The capacitive couplings between the Touch Controller and multiple conductors in the Active Matrix allows transmit signal(s) to be received by the Touch Controller.

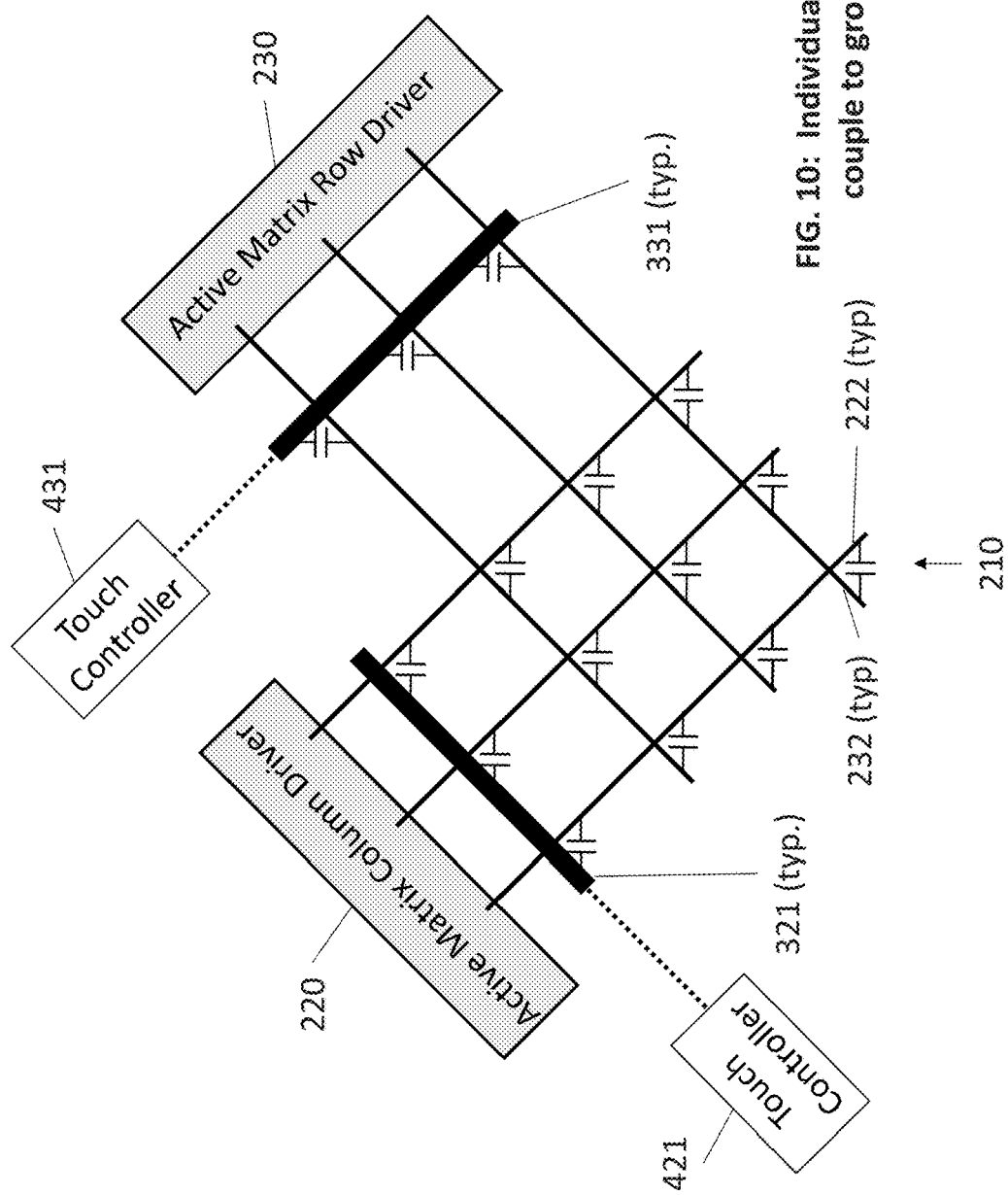
FIG. 10: Individual Touch Controllers may be used to couple to groups of Active Matrix rows and columns.

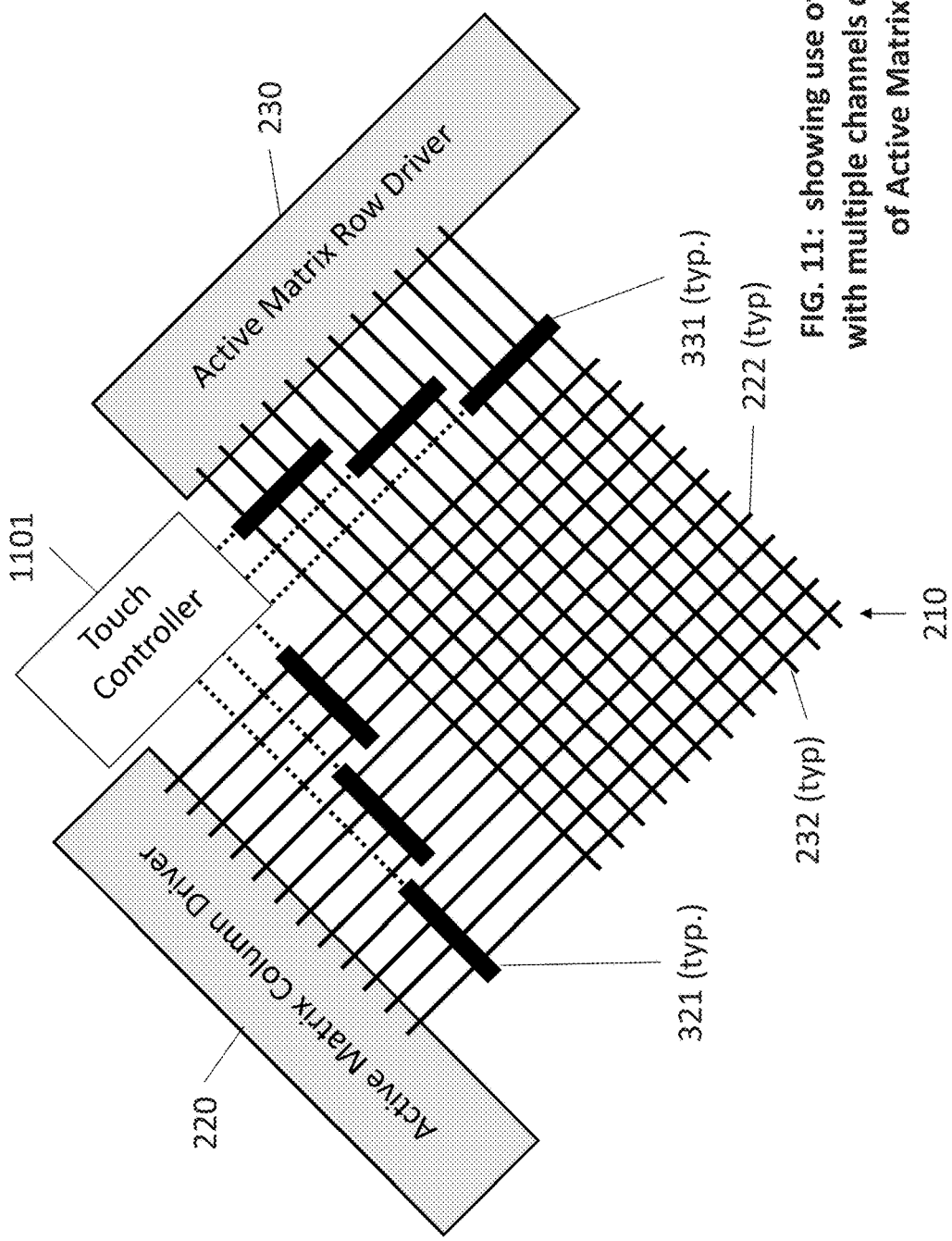
FIG. 11: showing use of a single Touch Controller with multiple channels coupled to multiple groups of Active Matrix rows and columns

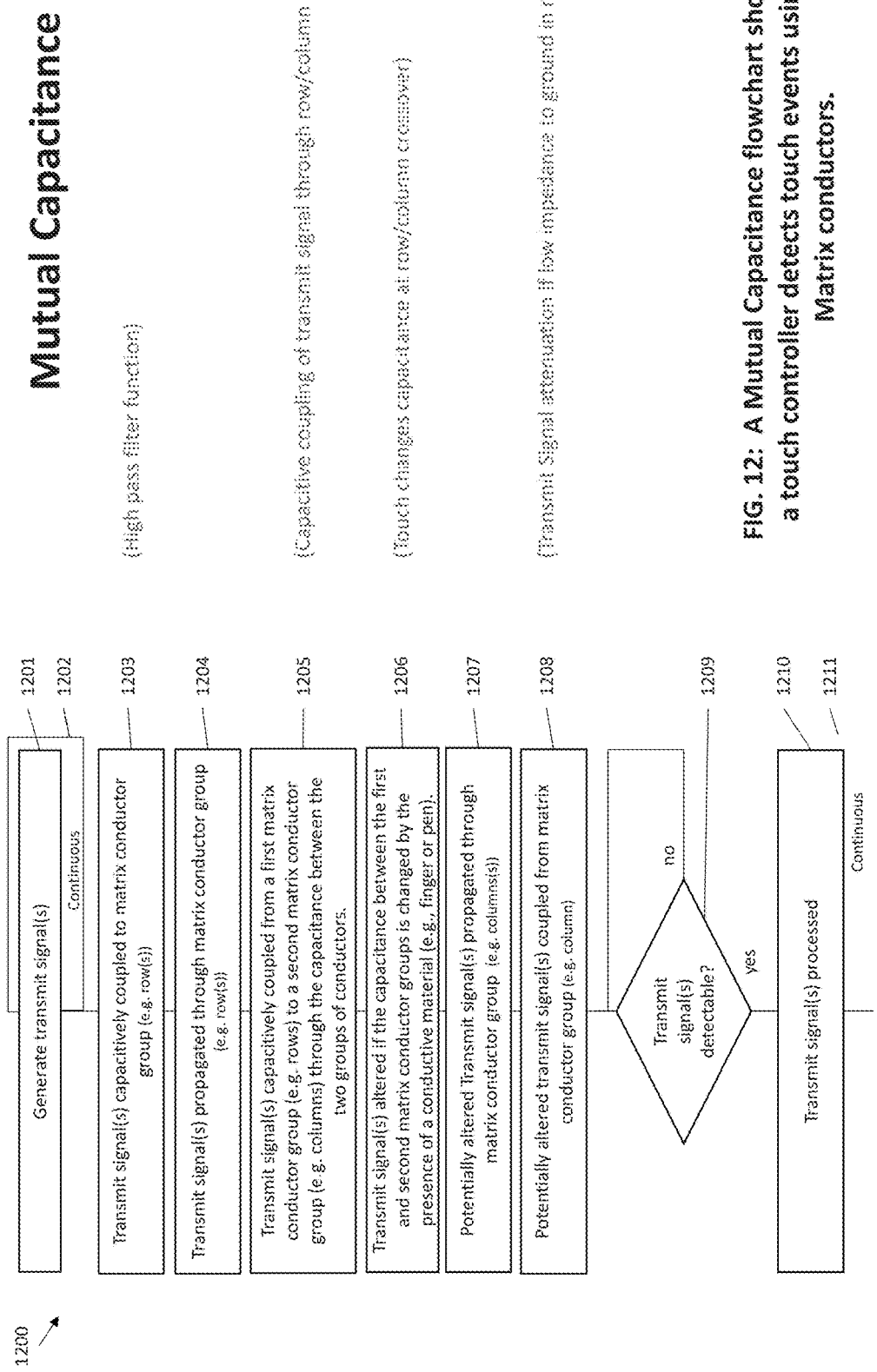
FIG. 12: A Mutual Capacitance flowchart showing how a touch controller detects touch events using Active Matrix conductors.

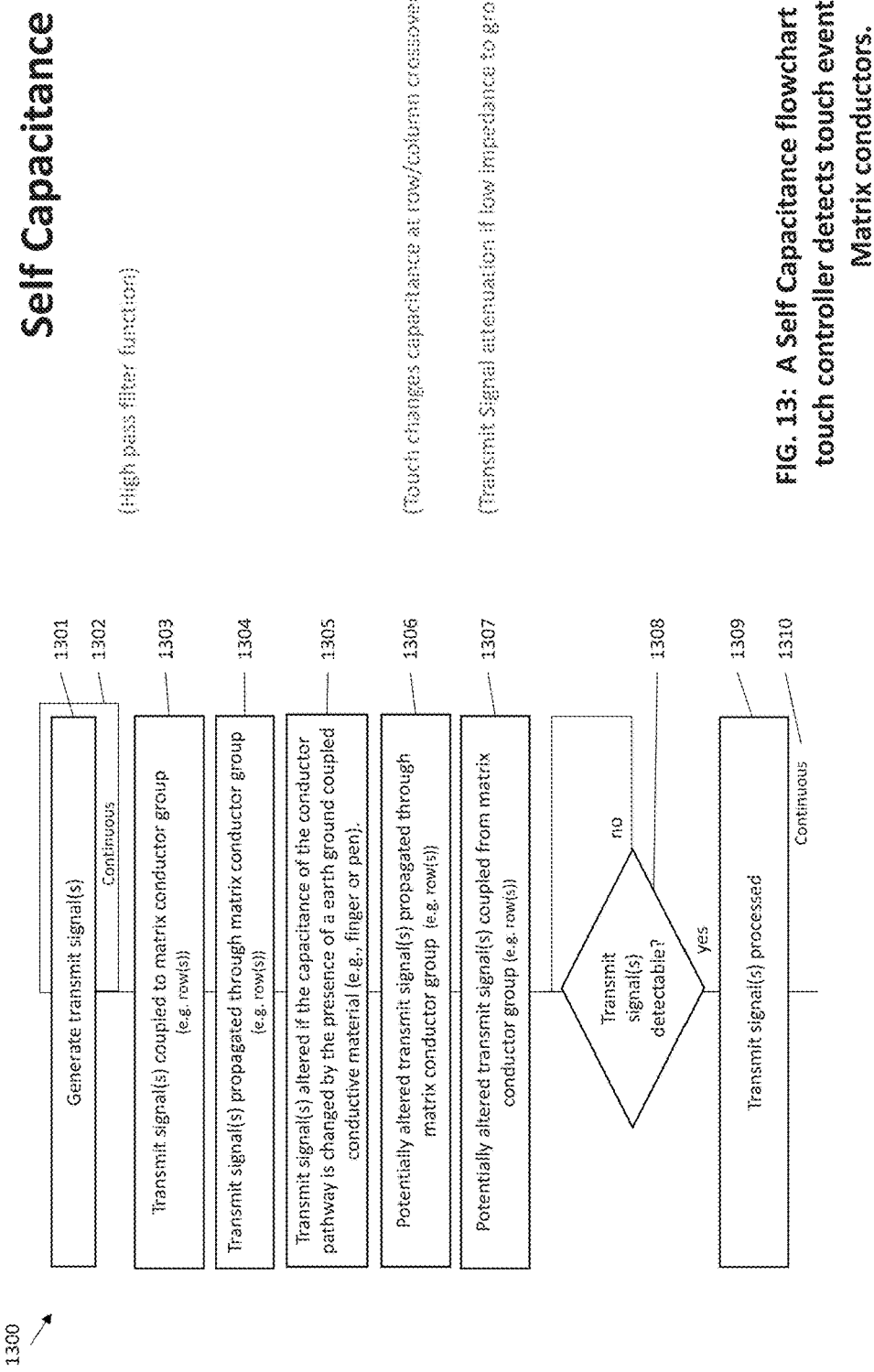
FIG. 13: A Self Capacitance flowchart showing how a touch controller detects touch events using Active Matrix conductors.

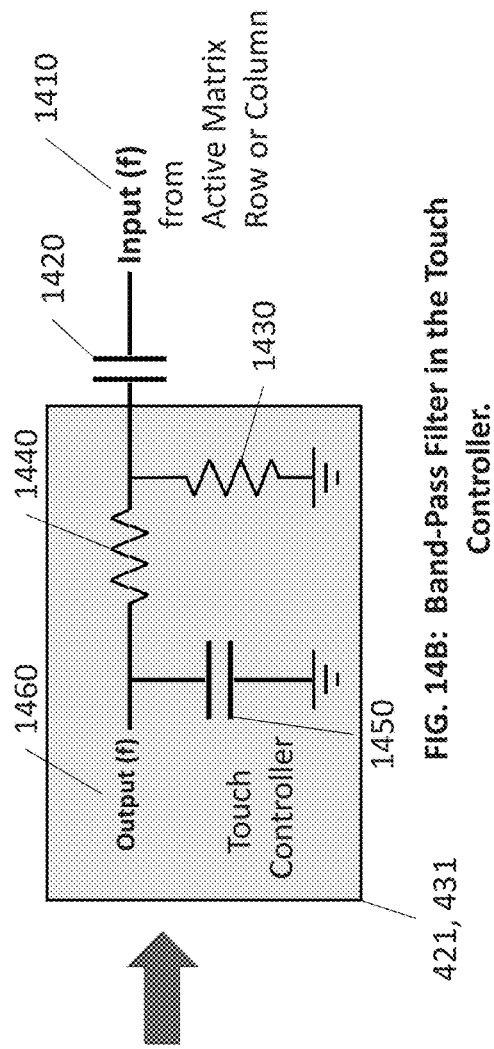
FIG. 14A: Definition of a Band-Pass Filter.
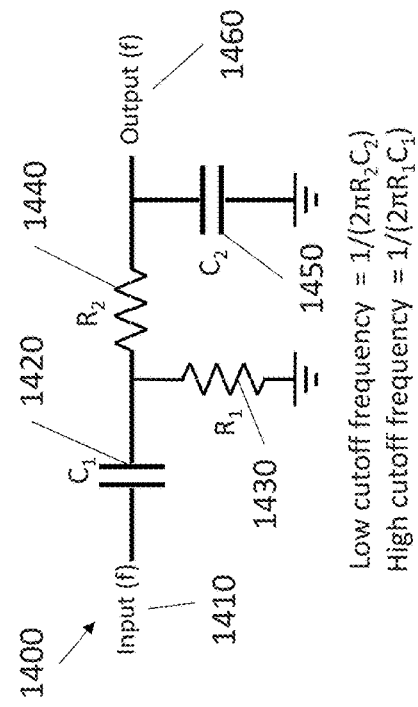
FIG. 14B: Band-Pass Filter in the Touch Controller.
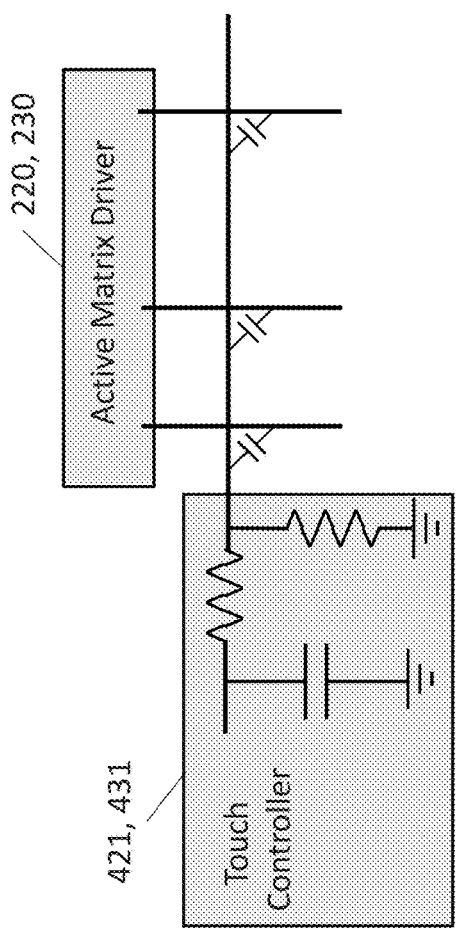
FIG. 14C: Use of a Band-Pass Filter on a Touch Controller channel connected to multiple Active Matrix conductors.

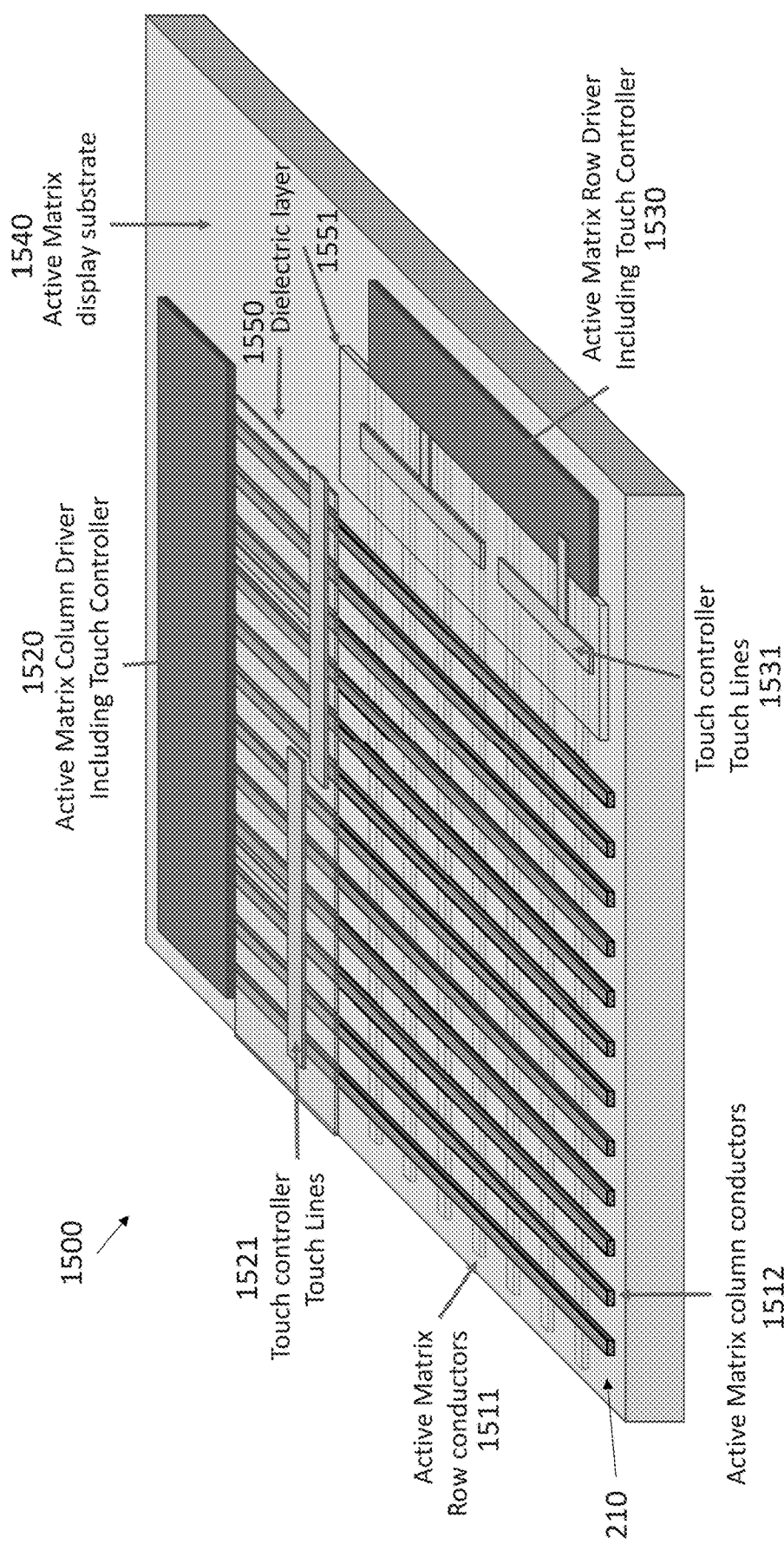
FIG. 15: 3D layout of Touch Controller integrated into an Active Matrix row and column driver and capacitively coupled to groups of Active Matrix rows and columns.

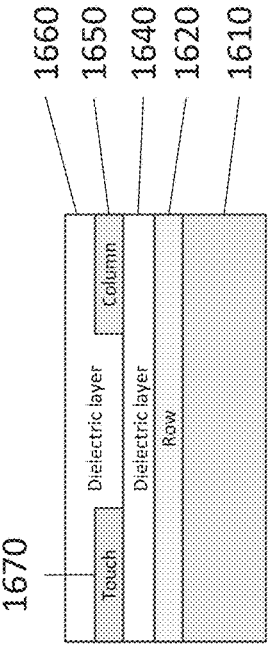

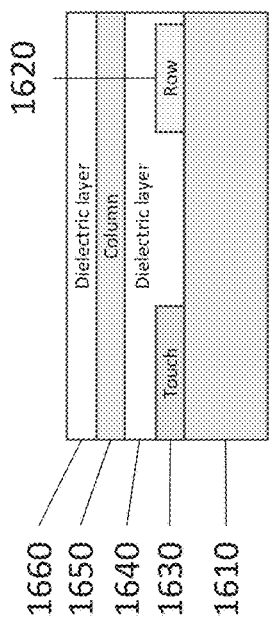

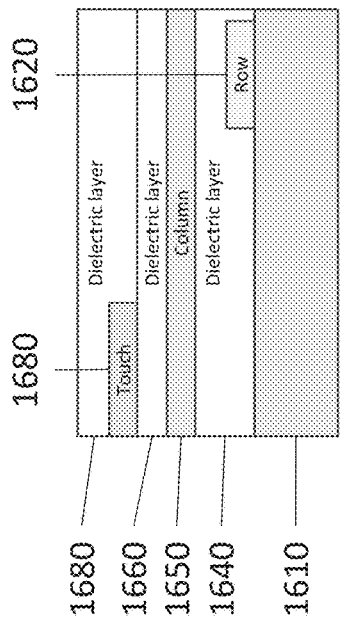

FIG. 16A: Layer stackup showing Touch lines capacitively coupled to Column lines.   FIG. 16B: Layer stackup showing Touch lines capacitively coupled to Row lines.

Figures 16A-B: Layer stackup from 3D drawing showing use of existing metal layers to fabricate Touch Controller coupling channel conductors to an Active Matrix row and column.

FIG. 16C: Layer stackup showing Touch lines capacitively coupled to Column lines.   FIG. 16D: Layer stackup showing Touch lines capacitively coupled to Row lines.

Figures 16C-D: Layer stackup from 3D drawing showing use of additional metal layers to fabricate Touch Controller coupling channel conductors to an Active Matrix row and column.

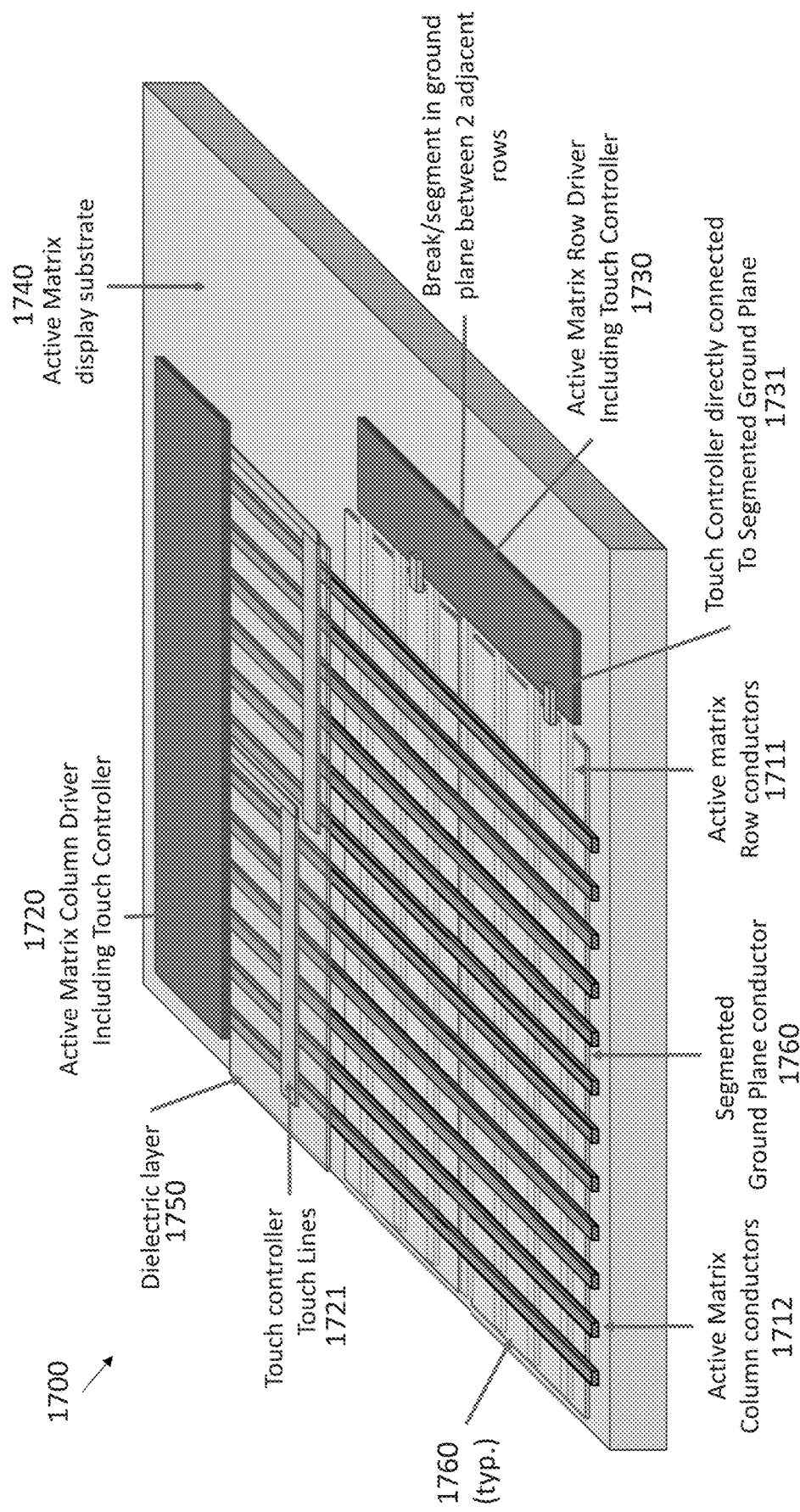
FIG. 17: 3D layout of Touch Controller integrated into an Active Matrix row and column driver and capacitively coupled to groups of Active Matrix columns and directly connected to a segmented ground plane.

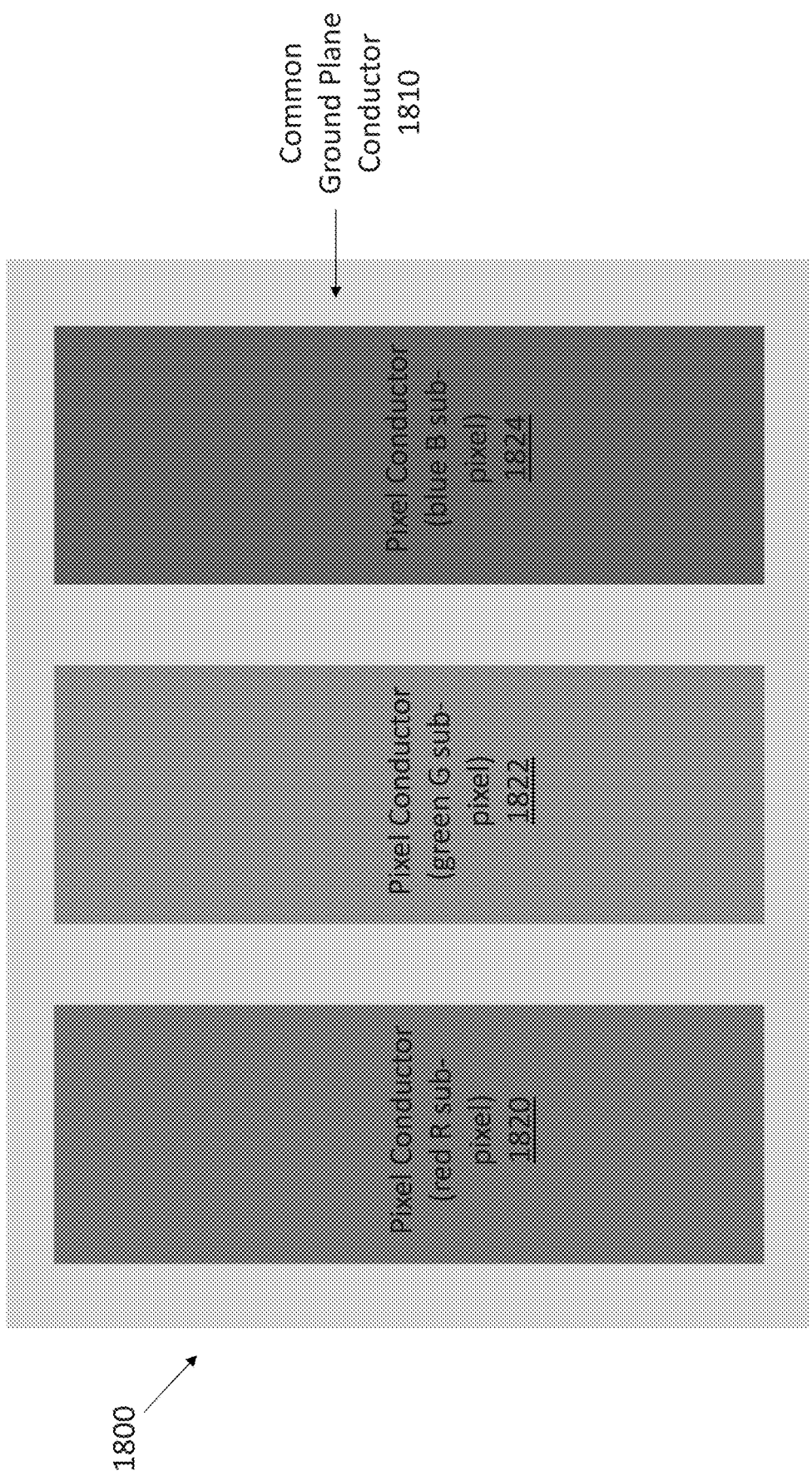
FIG. 18: LCD pixel layout, including RGB sub-pixels

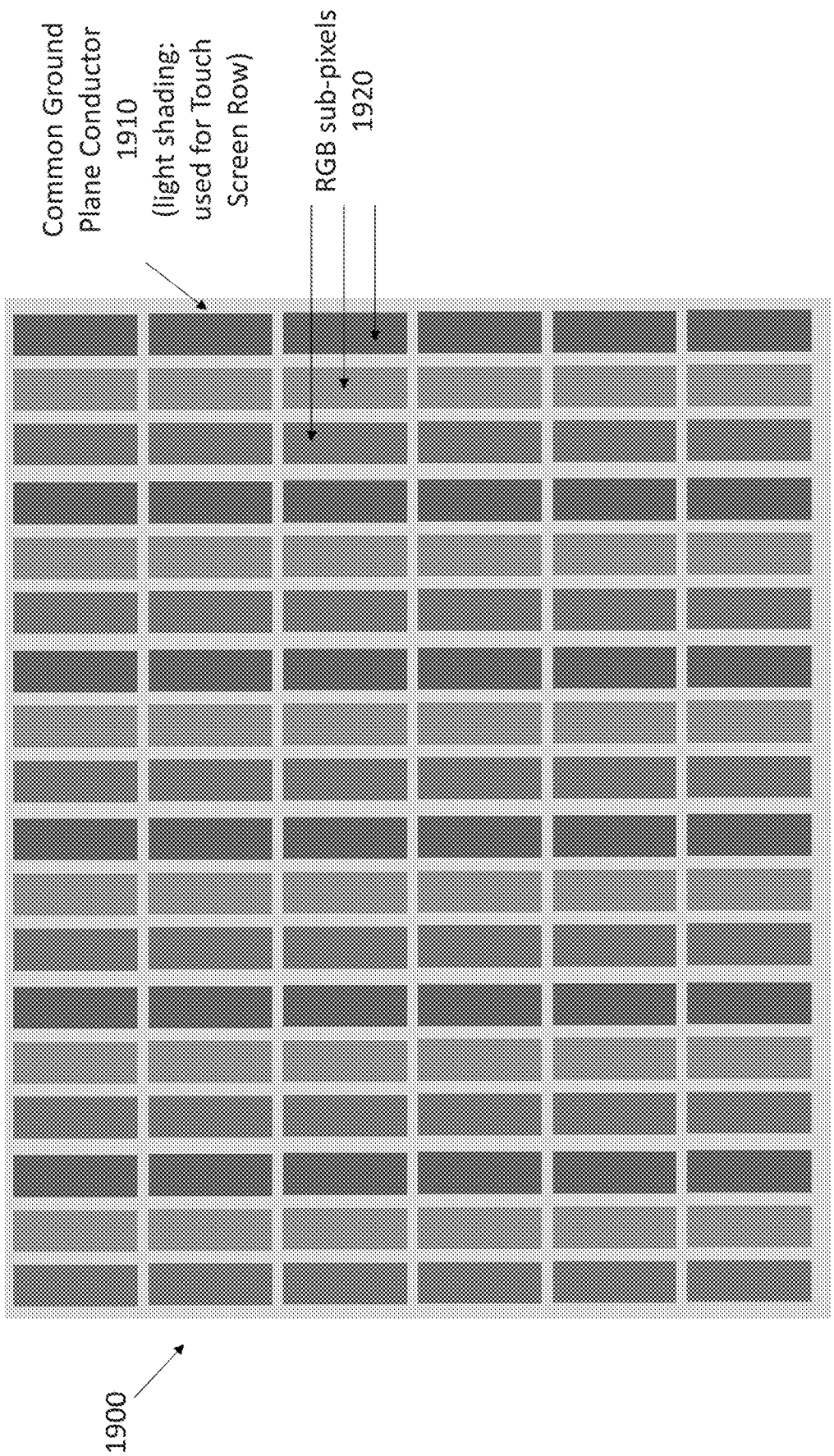
FIG. 19: LCD pixels with segmented common ground plane

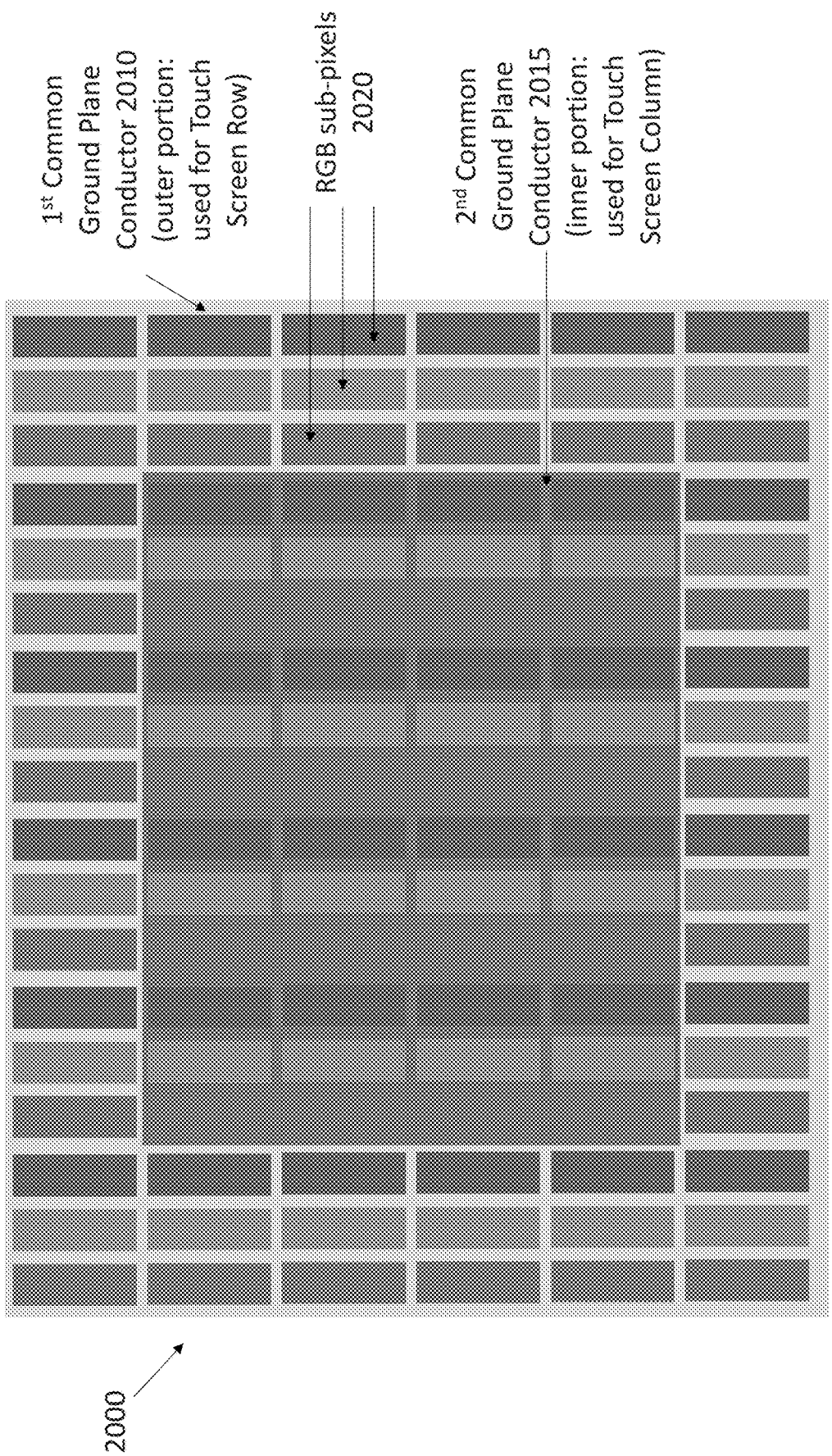
FIG. 20: LCD pixels with segmented common ground plane

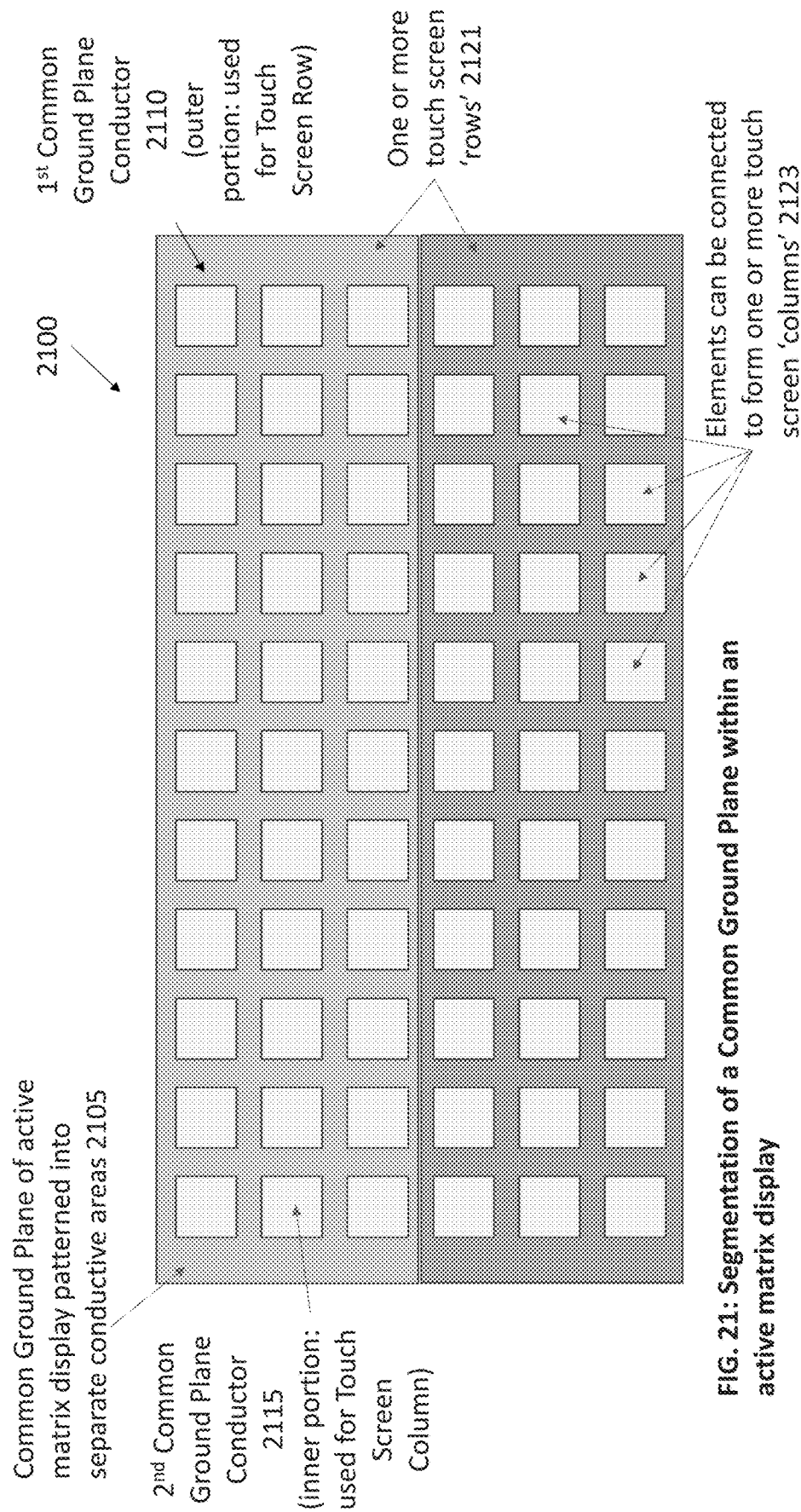
FIG. 21: Segmentation of a Common Ground Plane within an active matrix display

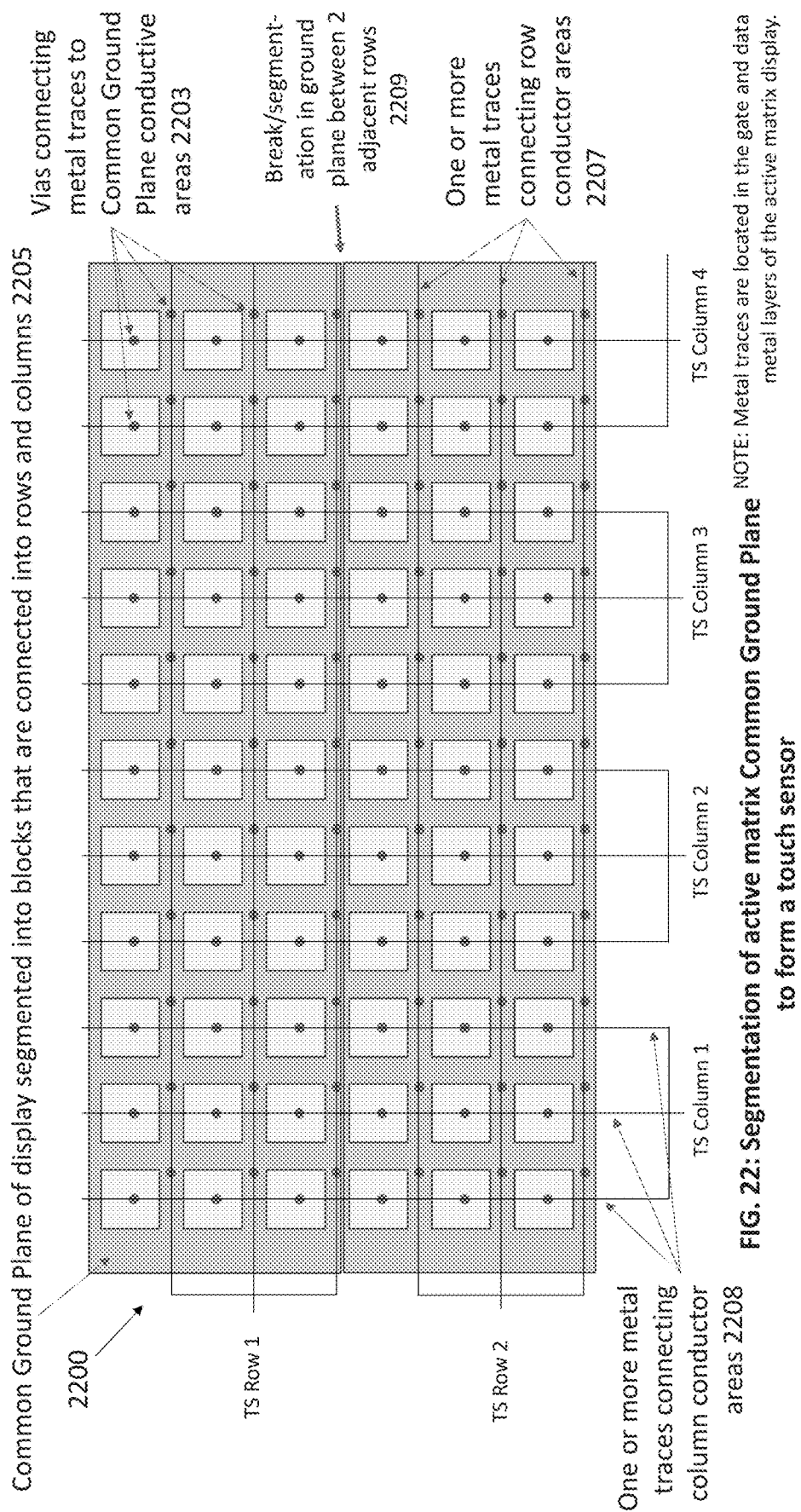
FIG. 22: Segmentation of active matrix Common Ground Plane to form a touch sensor

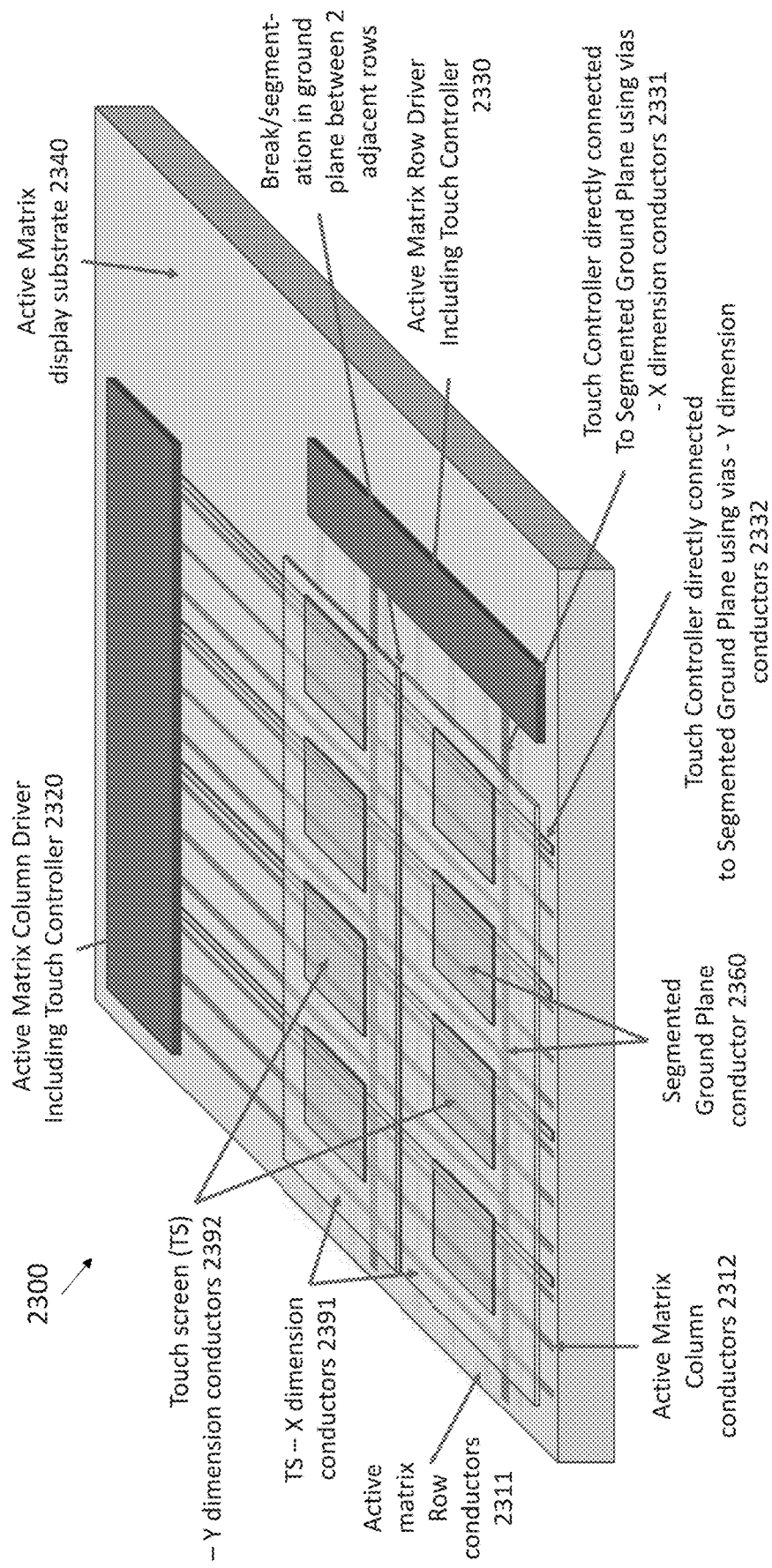
FIG. 23: 3D layout of Touch Controller integrated into an Active Matrix row and column driver and directly connected to various conductive elements of the segmented ground plane.

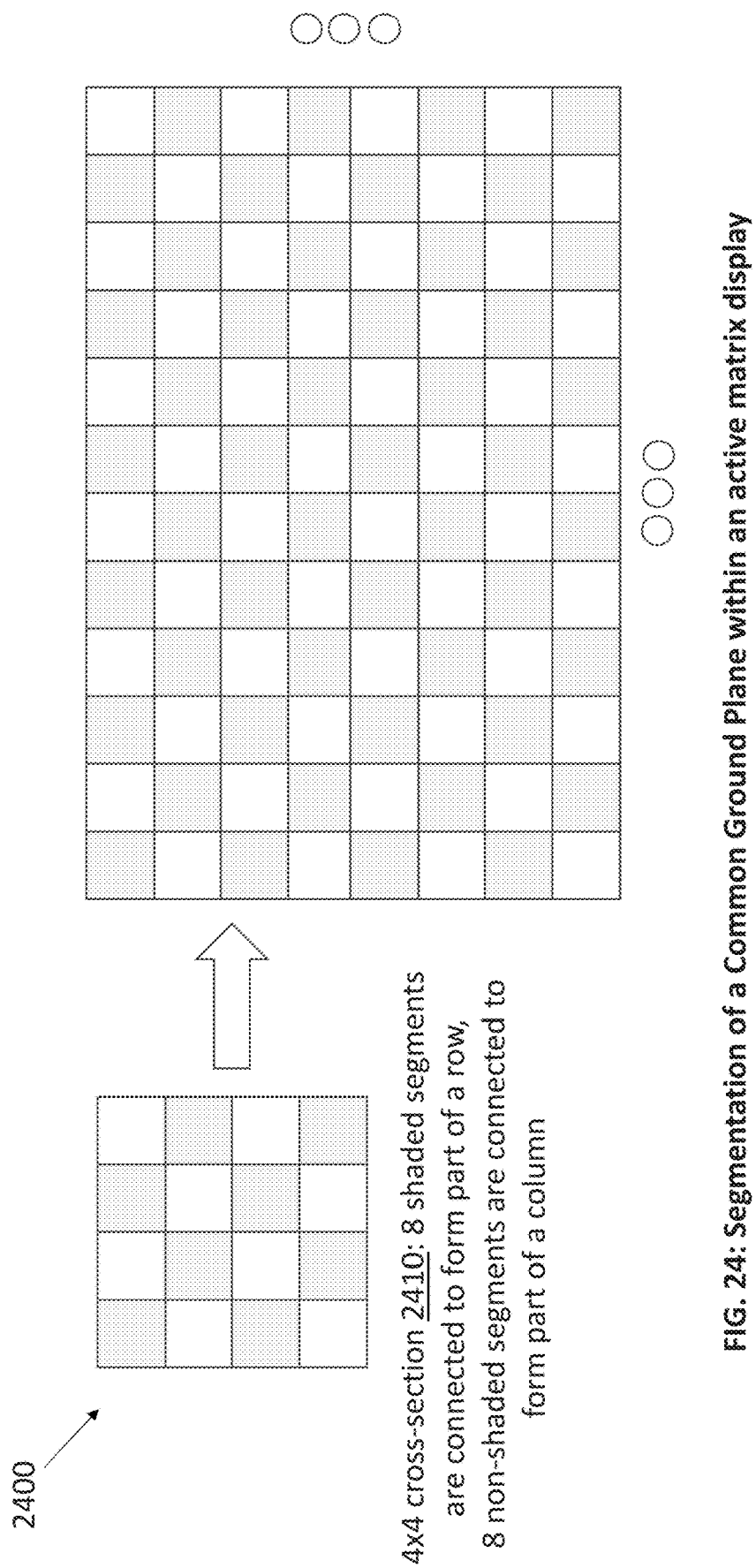
FIG. 24: Segmentation of a Common Ground Plane within an active matrix display

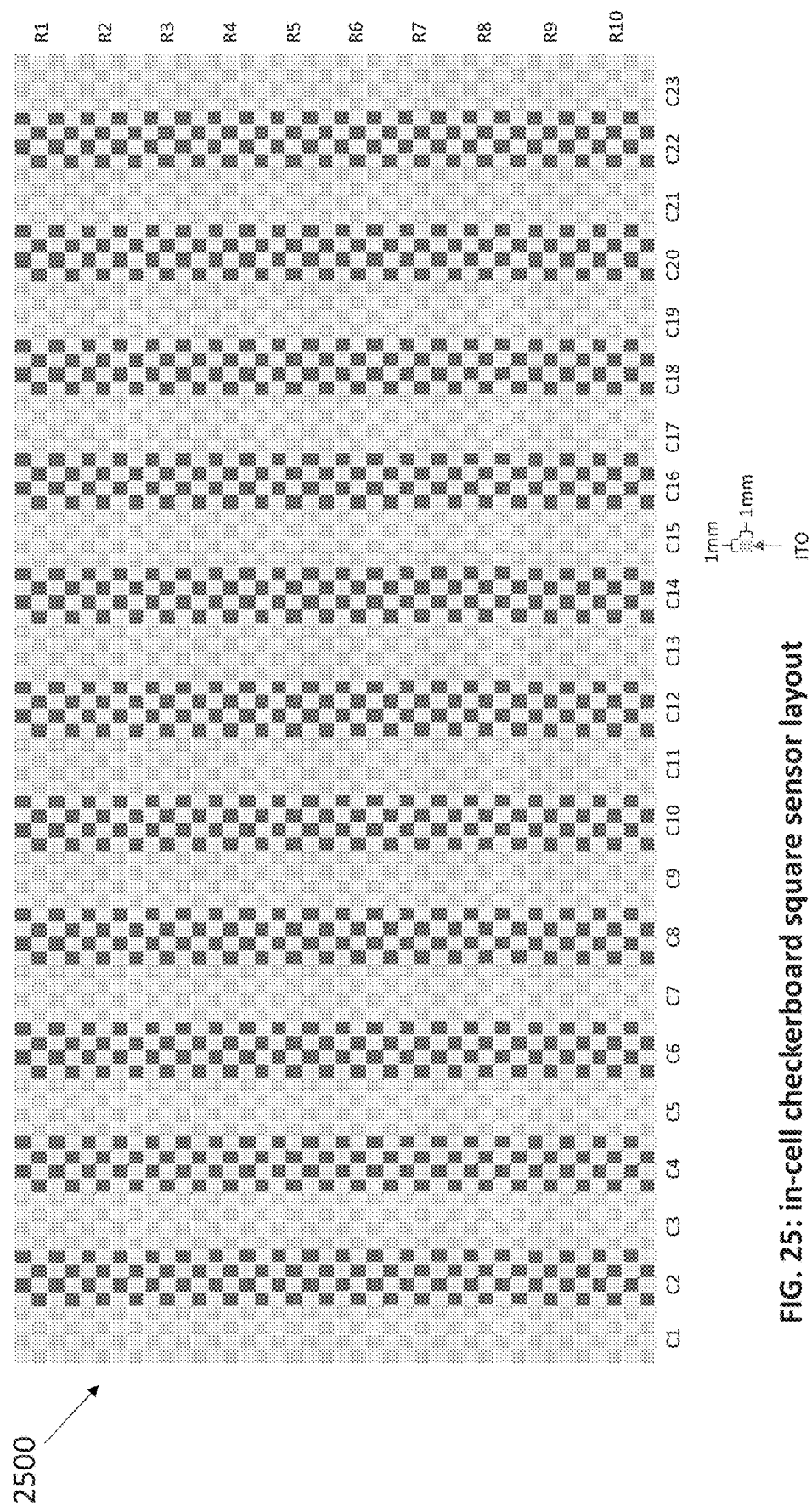
FIG. 25: in-cell checkerboard square sensor layout

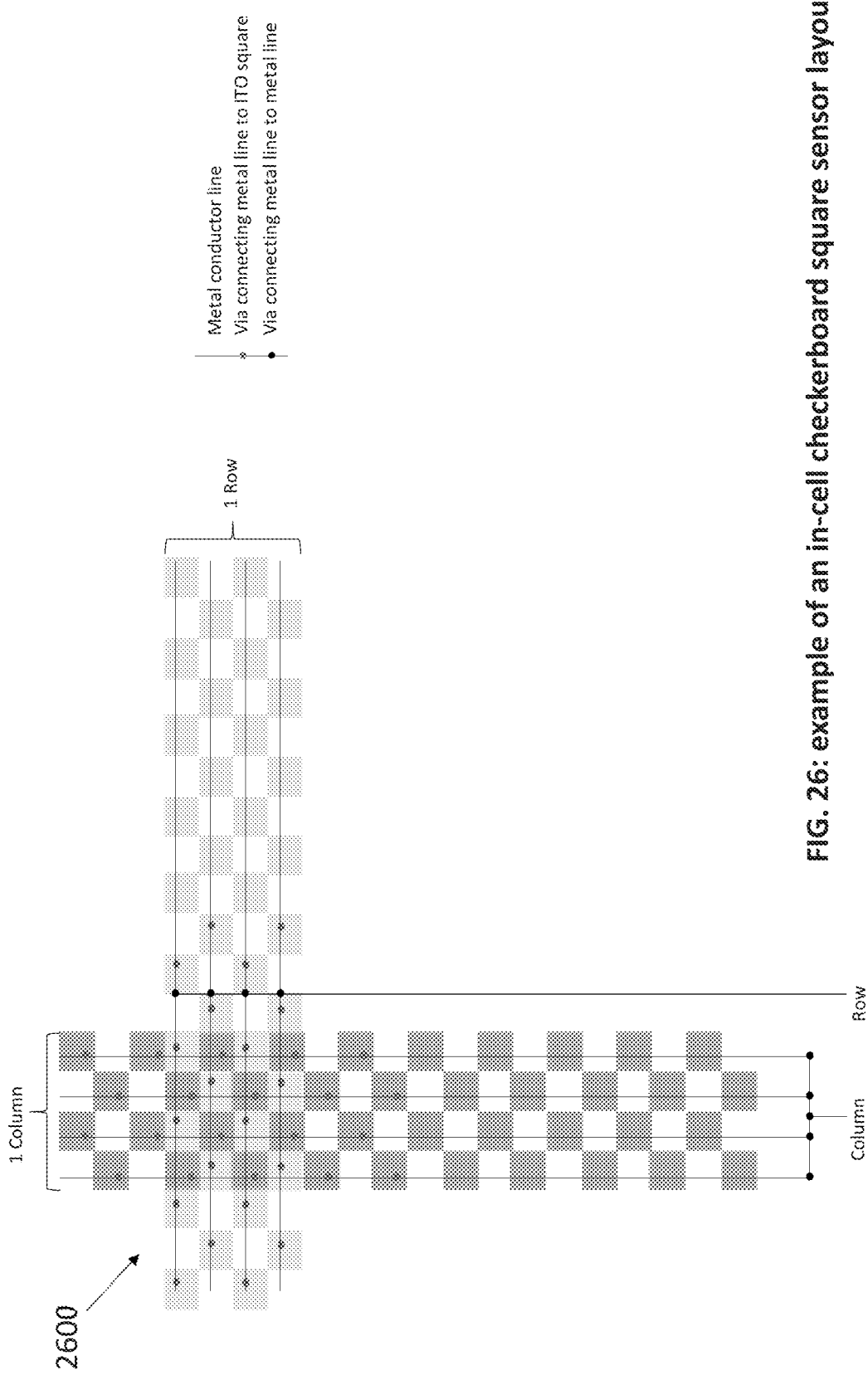
FIG. 26: example of an in-cell checkerboard square sensor layout

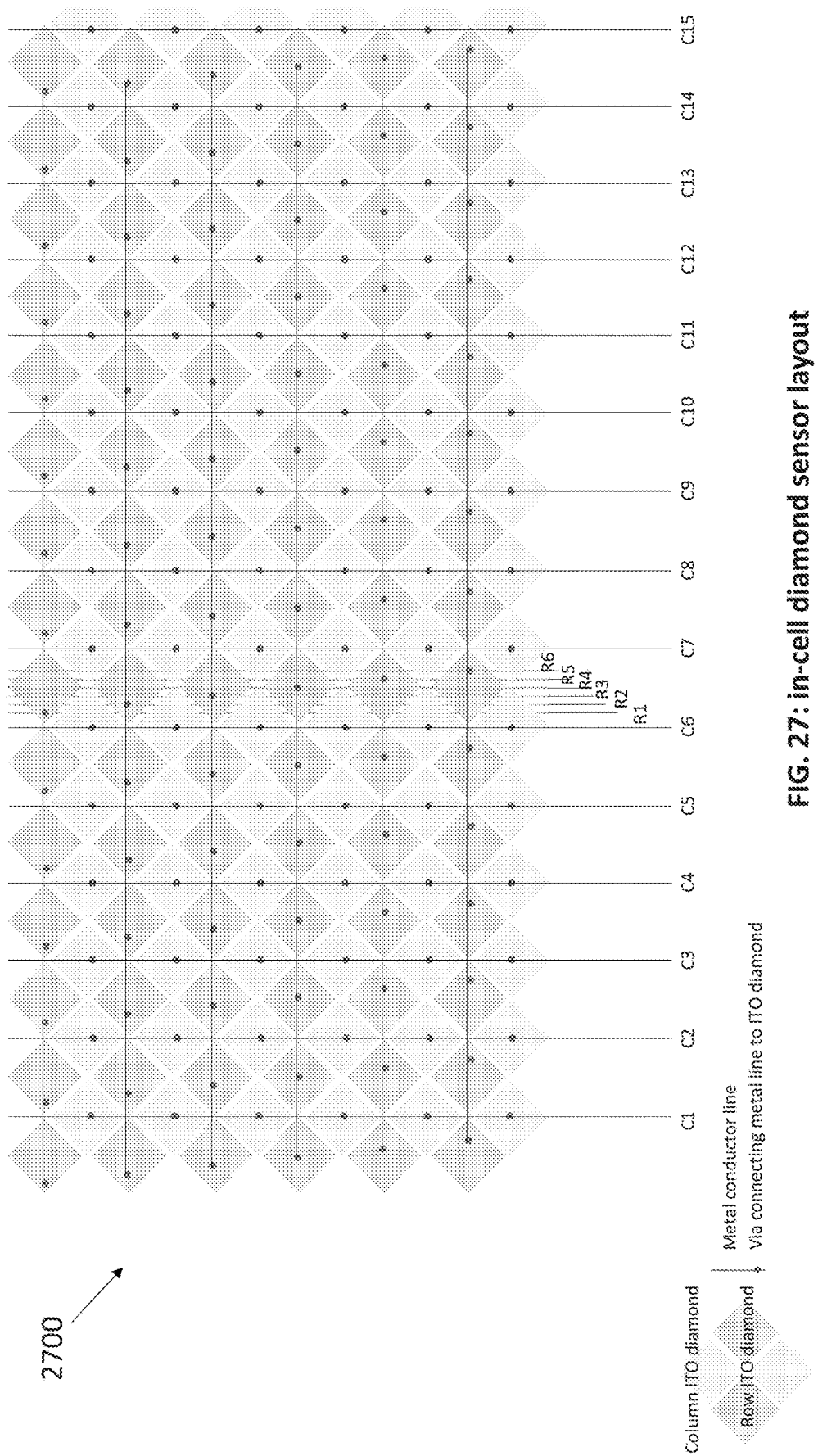
FIG. 27: in-cell diamond sensor layout

TOUCHSCREEN DISPLAY WITH CONCURRENT TOUCH AND DISPLAY OPERATIONS

CROSS REFERENCE TO RELATED APPLICATIONS

The present U.S. Utility Patent Application claims priority pursuant to 35 U.S.C. § 120 as a continuation of U.S. Utility application Ser. No. 16/131,634, entitled "TOUCHSCREEN DISPLAY WITH CONCURRENT TOUCH AND DISPLAY OPERATIONS," filed Sep. 14, 2018, pending, which claims priority pursuant to 35 U.S.C. § 119(e) to U.S. Provisional Application No. 62/559,282, entitled "CONCURRENT TOUCH AND DISPLAY OPERATIONS," filed Sep. 15, 2017, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to touchscreens and displays and more particularly to touchscreen displays that operate both touch and display operations concurrently and/or simultaneously.

Description of Related Art

Touch controller functionality has been integrated into a flat panel displays (aka In-Cell or On-Cell) in order to minimize the number of layers, assembly steps, and cost typically required to add external touch functionality to a flat panel display. This combination of touch and display functions within the flat panel display itself generally reuses at least some of the conductive pathways of the display to provide touch sensor functionality.

For typical in-cell configurations, the two different functions, namely, display control and touch sensing, co-exist by alternating display and touch controller operations. The prior art switches between operations of the touch controller and the display. For example, the display driver operations are paused for a short period of time so that the touch operations can be conducted. Among other reasons and because of various deficiencies of the prior art, this is performed because the signals generated by respective display control and touch sensing operations interfere with the normal operations of each other. For example, the 'noise' from the display operations generally overwhelms the signal processing capabilities of traditional touch controllers. Conversely, signals from the touch controller transmitted during normal LCD controller operations would alter the visible output of the LCD display. Therefore, in order to provide both capabilities integrated into a display, prior art devices allow only one of the respective display control and touch sensing operations to operate at a time. There continues to remain significant room for improvement in the art of touchscreens and displays.

BRIEF DESCRIPTION OF THE SEVERAL VIEWS OF THE DRAWING(S)

FIG. 1 illustrates various contemporary liquid crystal display (LCD) display architectures;

FIG. 2 illustrates an active matrix display in accordance with the present invention;

FIG. 3 illustrates an active matrix display showing the trace resistance and parasitic capacitance from the overlapping of the row and column conductors, but no circuitry that normally exists within each pixel or sub-pixel;

FIG. 4A illustrates the locations for integration of a concurrent touch function within an active matrix display in accordance with the present invention;

FIG. 4B illustrates a representative set of alternative single layer touch sensor architectures that can also be used with various embodiments;

FIG. 5A illustrates a concurrent touchscreen display device directly coupled to an active matrix in accordance with the present invention;

FIG. 5B illustrates a concurrent touchscreen display device capacitively coupled to an active matrix in accordance with the present invention;

FIG. 6A illustrates physical layout of the first row and column intersection of active matrix conductors within an active matrix display, highlighting the resistance and parasitic capacitance inherent in the exemplary structure;

FIG. 6B illustrates the components of FIG. 6A in a logical layout in accordance with the present invention;

FIG. 6C illustrates the components of FIG. 6A in a logical layout with capacitively coupled touch controllers in accordance with the present invention;

FIG. 7A illustrates the standard definition of a high pass filter;

FIG. 7B illustrates a high pass filter formed by a capacitively coupled touch controller and the components of an active matrix display;

FIG. 7C illustrates a high pass filter can be created at each location the touch controller is capacitively coupled to the rows or columns of an active matrix display in accordance with the present invention;

FIG. 8A illustrates a transmission path of a transmit signal generated by the touch controller that is capacitively coupled to a single row or column within the active matrix display in accordance with the present invention;

FIG. 8B illustrates a transmission path of a transmit signal generated by a touch controller that is capacitively coupled to a group of conductors (rows or columns) within an active matrix display in accordance with the present invention;

FIG. 9A illustrates a path of a transmit signal received from a conductor (row or column) of the active matrix display into a touch controller through a capacitively coupled connection in accordance with the present invention;

FIG. 9B illustrates a path of multiple transmit signals received from a group of conductors (rows or columns) of the active matrix display into a touch controller through multiple capacitively coupled connections in accordance with the present invention;

FIG. 10 illustrates separate touch controllers managing a group of rows and a group of columns in accordance with the present invention;

FIG. 11 illustrates a single touch controller managing multiple groups of rows and columns in accordance with the present invention;

FIGS. 12 and 13 are flowcharts of mutual capacitance or self capacitance methods of concurrent touch and display operations in accordance with the present invention;

FIG. 14A illustrates the standard definition of a band pass filter;

FIG. 14B illustrates band pass filter formed by a capacitively coupled touch controller with an additional resistor and capacitor and the components of an active matrix display;

FIG. 14C illustrates a band pass filter can be created at each location the touch controller is capacitively coupled to the rows or columns of an active matrix display in accordance with the present invention;

FIG. 15 is a schematic block diagram of an embodiment of a 3D layout of a concurrent touchscreen display device with capacitively coupled connections to an active matrix in accordance with the present invention;

FIGS. 16A-16B are schematic block diagrams of various embodiments of various stack configurations for coupling the touch controller to the active matrix conductors using existing metal layers in accordance with the present invention;

FIGS. 16C-16D are schematic block diagrams of various embodiments of various stack configurations for coupling the touch controller to the active matrix conductors using additional metal layers in accordance with the present invention;

FIG. 17 a schematic block diagram of an embodiment of a 3D layout of a concurrent touchscreen display device with both capacitive coupling and direct connections in accordance with the present invention;

FIG. 18 is a schematic block diagram of an embodiment of a liquid crystal display (LCD) pixel layout in accordance with the present invention;

FIG. 19 is a schematic block diagram of an embodiment of multiple LCD pixels with in accordance with the present invention;

FIG. 20 is a schematic block diagram of an embodiment of LCD pixels with a segmented ground plane in accordance with the present invention;

FIG. 21 is a schematic block diagram of an embodiment of segmentation of a common ground plane within an active matrix in accordance with the present invention;

FIG. 22 is a schematic block diagram of an embodiment of segmentation of a common ground plane in which the segments are connected to metal lines using vias to form a touch sensor in accordance with the present invention;

FIG. 23 is a schematic block diagram of an embodiment of a 3D layout of a concurrent touchscreen display device with touch controllers directly connected to segmented plane segments using metal lines and vias in accordance with the present invention.

FIG. 24 is a schematic block diagram of an embodiment of segmentation of a common ground plane within an active matrix in accordance with the present invention;

FIG. 25 is a schematic block diagram of an embodiment of an in-cell checkerboard sensor layout in accordance with the present invention;

FIG. 26 is a schematic block diagram of an embodiment of an in-cell checkerboard sensor layout in which metal lines use vias to connect to the ground plane segments and form a touch sensor in accordance with the present invention; and FIG. 27 is a schematic block diagram of an embodiment of an in-cell diamond sensor layout in which metal lines use vias to connect to the ground plane segments and form a touch sensor in accordance with the present invention;

DETAILED DESCRIPTION OF THE INVENTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure is directed to a device and method for providing concurrent touch and display operations using the conductive circuitry originally designed for a flat panel display. The control circuits for the flat panel display are configured such that both display operations and touch sensing operations are performed concurrently. The selected conductive pathways within the active flat panel display communicate signals for the display operations and detect user interaction (e.g., perform touch detection operations, stylus and/or pen detection, etc.) on the display. The touch controller functionality implemented to perform concurrent operations with a flat panel display using the existing flat panel display circuitry layers possesses certain attributes. For example, the touch controller functionality operates with very high sensitivity and use waveforms, voltages and frequencies that propagate through the set of conductors and do not materially alter the contents of the display.

In order to implement the various concurrent touchscreen display device embodiments described herein, the selected conductors within the flat panel display do not have any ground plane or other conductive layer that would electrically shield the selected conductive pathways from being affected by user interaction (e.g., sufficiently close proximity of a human touch, stylus, and/or conductive pen) with the surface of the display. In some LCD display types, this is inherent in the design. Others may operate by inverting the usual layer stack order to expose the selected conductive elements so that they can be influenced by the presence of an external conductor (e.g., finger, pen, stylus, etc.).

FIG. 1 shows a comparison of layers comprising 3 types of LCD displays. Of particular note is the layer stack of in-plane-switching (IPS) type LCD which possesses an architecture suitable for concurrent touch and display operations because it does not require an indium tin oxide (ITO) ground plane layer on the underside of the top glass that is required in the twisted nematic (TN) and vertical alignment (VA) mode architectures. Various displays, including Organic Light Emitting Diodes (OLED), could already possess a suitable architecture or could be modified to expose or pattern a desired set of conductors. For example, in a VA type LCD display, the active matrix thin-film transistor (TFT) layer could be placed on the surface of the display closest to the viewer and the ground plane could be on the side of the display closest to the backlight.

With respect to the TN mode and the VA mode, note that there are conductive ground plane layers (e.g., ITO) above and below the respective liquid crystal portions of the stack up. For example, there is a respective conductive ground plane layer of the top of the bottom glass and on the bottom of the top glass within the stack up.

With respect to the IPS mode, shown on the left-hand side of the figure, there is in-plane switching, and as such, there is no conductive ground plane layer on the top glass. Also, with respect to the IPS mode, there are conductors on the top of the bottom glass layer. However, note that the conductive ground plane layer is patterned differently than with respect to the TN mode and the VA mode given that the operation therein is based on the in-plane switching.

FIG. 2 illustrates an active matrix display 200 in accordance with various embodiments. The active matrix display 200 comprises an active matrix display area 210 having a grid of multiple conductive pathways 222, 232 (e.g., multiple rows and multiple columns), a first active matrix driver 220 coupled to a first set of multiple conductive pathways 222 (generically referred to as a row or column), and a second active matrix driver 230 coupled to a second set of multiple conductive pathways 232 (generically referred to as a row or column). Note that while the conductors described herein may be referenced as row or column conductors, it is not necessary that they be physically arranged as orthogonal sets of parallel conductor pathways. Note that numerous configurations of capacitive touch sensor architectures that can also be used, either single or multi-layer. This disclosure can take advantage of any set of conductors that has sufficient resolution and capacitance between features to detect the presence of external conductor (e.g., finger, pen, stylus, etc.) related activities on or near the surface of the display.

Also, there are many references to active matrix display in this disclosure, which is a type of addressing scheme used in flat panel displays. Note that there are many variations of flat panel display architectures. This disclosure is not limited to any particular display type or particular arrangement of conductors. Various aspects, embodiments, and/or examples of the invention (and/or their equivalents) may be implemented in accordance utilizes any arrangement of conductors that can be used for capacitive touch detection and any display technology or architecture that can support such. For example, FIG. 4B illustrates various examples of prior art from certain patent applications that show single layer touch sensors that could be utilized with this present disclosure if the conductive pathways in the display were arranged in such a fashion.

FIG. 3 illustrates an active matrix display 200 in accordance with various embodiments. The active matrix display 200 comprises an active matrix display area 210 having a grid of multiple conductive pathways 222, 232 (e.g., multiple rows and multiple columns), a first active matrix driver 220 coupled to a first set of multiple conductive pathways 222 (generically referred to as a row or column), and a second active matrix driver 230 coupled to a second set of multiple conductive pathways 232 (generically referred to as a row or column). A first conductor intersection 300 is highlighted. No pixel or sub-pixel circuitry is included in the illustration, while it may affect the performance of the touch function and may differ greatly between the various display technologies, the effect is common to all conductive pathways within a single display and therefore can be managed by baselining the characteristics of each individual display. Any variation of capacitance detectable on the active matrix conductors due to changes amongst the various states of the pixel or sub-pixel circuitry, once characterized, can be managed by software/firmware within the touch controller function. This diagram illustrates that each conductive pathway 310, 320 in the matrix has inherent pathway resistance 312, 322 and that wherever the row and column conductors cross (when separated by a dielectric layer), an intersection capacitor 313 is created. In multi-layer touch sensors, the row to column capacitance is created where the conductors cross over each other (separated by a dielectric). In single layer capacitive touch panels, intersection capacitance is created in-plane at the boundaries between the various conductive areas, and in some architectures, there is a small crossover as well (e.g., in accordance with a 'diamond' pattern with bridges). Also shown is the conductive pathway ground 311, 321 is contained within the active matrix drivers 220, 230. Generally, there is a resistance to ground 311, 321 within these drivers. This resistance to ground 311, 321 may or may not be switched from a high resistance state to a low resistance state by the active matrix driver 220, 230 depending on the operation being performed by the active matrix driver 220, 230.

In addition, note that the one or more signals provided from any touch controller as described herein may be of any, one or more, and/or any combination of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a touch controller may be of a unique frequency being different from signals provided from that same touch controller and/or other touch controllers. Also, a signal provided from a touch controller may include multiple frequencies independently or simultaneously. The frequency of the signal can be hopped on a pre-arranged pattern. In some examples, a handshake is established between one or more touch controllers and one or more processing modules (e.g., one or more drivers, controllers, etc.) such that the one or more touch controller is/are directed by the one or more processing modules regarding which frequency or frequencies and/or which other one or more characteristics of the one or more signals to use at one or more respective times and/or in one or more particular situations.

FIG. 4A illustrates a touchscreen display device with a concurrent active matrix display 400 in accordance with various embodiments. The active matrix display 400 comprises an active matrix display area 210 having a grid of multiple conductive pathways 222, 232 (e.g., multiple rows and multiple columns), a first active matrix driver 220 coupled to a first set of multiple conductive pathways 222 (generically referred to as a row or column), and a second active matrix driver 230 coupled to a second set of multiple conductive pathways 232 (generically referred to as a row or column). The first touch controller 421 is coupled to one or more of the first set of multiple conductive pathways 222 within the active matrix display 210. Similarly, the second touch controller 431 is connected to one or more of the second set of multiple conductive pathways 232 within the active matrix display 210. The manner and location of connection of the touch controllers 421, 431 to the active matrix display 210 can be established with various architectures, as will be described in later embodiments. For example, alternate locations of touch controller 422, 432 illustrate their location at the opposite end of the active matrix conductors 222, 232. Further, a touch controller (e.g., first touch controller 421, second touch controller 431) can be integrated into an active matrix driver 220, 230, respectively, other components within a host device, or contained within dedicated and discrete circuitry. In various embodiments, the active matrix drivers 220, 230 can be integrated into a single circuit or in separate circuits in one or more packages. In various embodiments, the touch controllers 421, 431, 422, 432 while logically separate, but may or may not be physically separate and can be integrated into a single circuit in one package or in separate circuits in one or more packages.

In accordance with various embodiments, each touch controller channel can be connected to a conductive pathway within or on the active matrix display. The conductive pathways can be rows (or gate lines), columns (or data lines), other channelized conductive layers (e.g., segmented $V_{COM}$), and/or combinations of other conductive zones grouped (either on screen or off screen) into logical conductive pathways. In some examples, with respect to the display operation, the a number of thin-film transistors (TFTs) are implemented that facilitate operation of the respective pixels and/or sub-pixels of the display (e.g., implemented in an RGB, red green blue, implementation). Data lines are coupled or connected to the source side of the TFTs, gate lines are coupled or connected to the gate of the TFTs, and the transparent conductive material (e.g., ITO) of the respective pixel and/or sub-pixel is coupled or connected to the drain side of the TFTs. There is an additional conductive layer (sometimes referred to as a 'common ground plane') in all active matrix displays that is generally common to all pixels or sub-pixels. Note that such coupling or connectivity described herein is based on the display architecture itself and not with respect to the architecture or operation of the touchscreen display.

Moreover, note that while certain of the different respective embodiments, examples, etc. described herein are described with reference to displays that operate based on liquid crystal display (LCD) related technology and the associated active-matrix display thereof, note that various aspects, embodiments, and/or examples of the invention (and/or their equivalents) may alternatively be applied to touchscreen displays operating using any desired alternative technology (e.g., LCD, organic light emitting diode (OLED), Electroluminescent Display (ELD), Plasma, Quantum Dot, etc.).

In some examples, a selection can be made of any two sets of these conductive pathways in the locations(s) desired to detect touch and pen operations that are arranged in such a fashion to exhibit sufficient capacitance as part of a logical intersection such that the change in capacitance from the presence of an external conductor material (e.g., finger, pen, etc.) on the outer or front surface of the display can be used to determine touch or pen locations. Consequently, in various embodiments, a suitable set of conductive pathways has no ground plane or other conductive layer that would electrically shield the selected conductive pathways from being affected by a touch or pen on the surface of the display.

The various methods for connecting the touch controller circuitry to conductive pathways in an active matrix display stack allow for the transmission and reception of touch operation signaling on top of the signaling (e.g., voltages) placed on the active matrix conductor channels. In some examples, the signals used by the touch functions are of such waveform, frequency or voltage as not to interfere with the normal active matrix display operations and therefore have little to no effect on the display operations.

As referenced above, the manner of connection of the touch controllers 421, 431 to the active matrix display 210 can be established with various architectures. Three methods for electrically connecting the touch controller channels to the active matrix circuits include: direct connections, capacitive coupling and a hybrid of the two. Direct connections employ a touch controller channel directly connected to each row or column conductor (or fewer than all, such as a subset of the row or column conductor(s)) utilized.

FIG. 5A illustrates a concurrent touchscreen display device 500 using direct connections. The touchscreen display device 500 comprises the active matrix display 210, the first active matrix driver 220 coupled to the multiple columns, and the second active matrix driver 230 coupled to the multiple rows. The first touch controller 421 implements one or more direct connections 520 to conductors of the first set of multiple conductive pathways 222, with three direct connections shown in FIG. 5A. Similarly, the second touch controller 431 implements one or more direct connections 530 to conductors of the second set of multiple conductive pathways 232, with two direct connections shown in FIG. 5A. In some examples, direct connections of this type are electrically isolated from each other either at some point along the signal trace or within a touch controller circuit itself in such a fashion that these additional connections do not in some way alter the proper operation of the active matrix display. Note that there are a number of options to provide this electrical isolation. In this example, note that the touch controller is physically connected to certain rows and/or columns.

A touch controller channel can have multiple direct connections to conductors, where the multiple direction connections are electrically isolated from each other. Although it is possible to connect a touch controller channel to each and every row and column in the display, it may not be desired due to certain considerations such as the cost of so many connections, trace routings, and an application-specific integrated circuit (ASIC) size required to accomplish this. In various embodiments, a direct connection method is implemented where the direct connections are made to a subset of the total number of rows and columns rather than to all of them. For example, a direct connection can be made to one of every N conductors, where N is an integer value greater than 1. The percentage of rows and columns directly connected can be designed based on a performance vs. cost tradeoff decision. Given that the conductive pathways (i.e.

row and column conductors) are usually smaller than the traditional touch sensor channel width (e.g., 5 mm or within the range of 3-10 mm), the number of row or column conductors utilized in a touch controller channel can vary, depending on design. To create channelized data (similar to that in existing touch sensors that employ the typical 5 mm wide conductive channels), data from multiple adjacent touch controller channels can be combined mathematically into a virtual channel in order to minimize the backend data processing requirements. In order to improve location accuracy, the groupings, or virtual channels, could be accomplished by using data from bordering touch controller channels in both adjacent groups (or virtual channels).

A capacitive coupling connection to a touch controller channel can be done to one or more rows (or columns) without causing any significant disruption to their designated functions.

FIG. 5B illustrates a concurrent touchscreen display device 550 using capacitive coupling connections. Similar to touchscreen display devices 400, 500, the touchscreen display device 550 comprises the active matrix display 210, the first active matrix driver 220 coupled to the multiple columns, and the second active matrix driver 230 coupled to the multiple rows. The first touch controller 421 implements one or more capacitive coupling connections 521 to multiple column conductors, with three capacitive coupling connections shown in FIG. 5B. Similarly, the second touch controller 431 implements one or more capacitive coupling connections 531 to multiple row conductor, with two capacitive coupling connections shown in FIG. 5B. The capacitive coupling connections 521, 531 each comprise multiple adjacent conductors 222, 232, respectively. The increase in capacitor area of the aggregated rows (or columns) improves the sensitivity of the touch function by monitoring several conductors at a time for a touch operation, rather than individual conductors via a direct connection method. If the metal conductors of the active matrix gate and data lines are used, the matrix becomes, in effect, a metal mesh touch sensor. In this example, note that the touch controller is coupled via capacitively coupling (CC) to certain rows and/or columns. With respect to the implementations within FIG. 5A and FIG. 5B, note that the touchscreen operation of the touchscreen display is implemented using the actual elements and components (e.g., lines) that are implemented within the device for display operations. Those elements and components associated with the display operation of the touchscreen display are used in a new way. Different and additional signals are provided concurrently (e.g., at the same time, simultaneously, etc.) with the signals that are provided to facilitate display operation of the touchscreen display on the same respective lines, conductors, elements, etc.

In order to process touch operations caused by a touch or pen on the surface of the display, the touch controller monitors the change in capacitance occurring on the monitored conductive pathways. In some examples, note that the common ground plane conductive material is implemented on the opposite side of a dialectic material (e.g., glass) that is associated with the conductors where a finger touches. For example, considering the example illustrated on the left-hand side of FIG. 1, the IPS mode, there would be a TFT layer on the top (or above the ground plane layer) and not on the bottom in certain instances.

An active matrix driver transmits drive signals (typically a pulsed or switched direct current (DC) signal) for the display operations though the active matrix with the appropriate voltage level for the desired operation. Independently, a touch controller 421, 431 generates a transmit signal propagated through the capacitive coupling connections 521, 531. The touch controller's 421, 431 transmit signal is a unique signal, separate from and in addition to, the display drive signal. The transmit signal can be provided by a touch controller 421 and monitored by either touch controller 421 or touch controller 431. Alternatively, the transmit signal can be provided by a touch controller 431 and monitored by either touch controller 421 or touch controller 431.

FIG. 6A shows a first conductor intersection 300 (originally shown in FIG. 3) illustrating resistance and capacitance of the rows and columns, including the path to ground for the circuit. FIG. 6B redraws the same components from FIG. 6A into an electrically equivalent linear schematic layout. Active matrix drivers 230, 220 control the display signaling that is placed onto the row conductor 310 and the column conductor 320. The row conductor 310 has a row resistance 312 and column conductor 320 has column resistance 322. The intersection of the row conductor 310 and column conductor 320 creates an intersection capacitor 313. This intersection capacitor 313 is in the display area 210 and is affected by the presence of an external conductive material (e.g., finger, pen) on or near the surface of the display. FIG. 6C shows the representative location where the touch controllers 421, 431 capacitively couple 321, 331 to the active matrix conductive pathways.

FIG. 7A illustrates a high pass filter 700, comprising an input waveform 710 having a frequency of 'f'. This waveform passes through capacitor 720 and is attenuated by resistor 730. The high pass filter 700 has a defined as cutoff frequency $f=1/(2\pi RC)$. A cutoff frequency is a boundary in a filter's frequency response at which energy flowing through the filter begins to be reduced (attenuated or reflected) rather than passing through. When the combination of transmission frequency, capacitor 720 and resistor 730 meet appropriate system design requirements, an output waveform 740 passes through the high pass filter 700. FIG. 7B illustrates the components in the active matrix, with the touch controllers added, which comprise a high pass filter. The input waveform 710 (transmit signal) can be generated by the touch controllers. The waveform (transmit signal) is coupled through capacitor 720 onto the conductive pathways which are driven by active matrix drivers. The resistor 730 to ground is located within the active matrix driver. FIG. 7C illustrates a first touch controller capacitively coupled to a row and a second touch controller coupled to a column, each of which creates a high pass filter.

FIG. 8A illustrates the path the transmit signal follows once it leaves a touch controller, such as touch controllers 421, 431. FIG. 8B illustrates how a transmit signal can be coupled to multiple conductor pathways, such as multiple conductive pathways 222, 232.

FIG. 9A illustrates the path the transmit signal follows to get to the receiving touch controller. This transmit signal may be significantly attenuated, even to the point it is no longer detectable, if the resistance to ground, for this conductor, in the active matrix driver is too low. This diagram shows capacitive coupling between the Touch Controller and the Active Matrix allows transmit signals to be received by the Touch Controller. However, if the resistance to ground in the Active Matrix Driver is too low, the transmit signals will be significantly attenuated, possibly below the detection capability of the Touch Controller. FIG. 9B illustrates the receive path when multiple active matrix conductors are capacitively grouped together into a virtual touch controller channel. The transmit signal will be coupled to the touch controller from all of the conductors in the group which do not have a low resistance to ground. This diagram shows capacitive couplings between the Touch Controller and multiple conductors in the Active Matrix allows transmit signal(s) to be received by the Touch Controller. However, if the resistance to ground in the Active Matrix Driver is too low, the transmit signal will be significantly attenuated, possibly below the detection capability of the Touch Controller.

FIG. 10 illustrates the layout of individual touch controllers, such as touch controllers 421, 431, that transmit and receive while capacitively coupled to multiple active matrix conductors, such as multiple conductive pathways 222, 232. This diagram shows different touch controllers 421 and 431 implemented on row and column operations, respectively. For example, touch controller 421 is implemented for row operation, and touch controller 431 is implemented for column operation.

FIG. 11 illustrates the layout of a single touch controller 1101 capacitively coupled to multiple conductor groups, such as multiple conductive pathways 222, 232, on both the row and column conductors. This diagram shows a single touch controller 1101 that is implemented for both row and column operation.

Various examples of touchscreen displays are presented herein. In some examples, a touchscreen display includes one or more display drivers coupled to an active matrix display via a plurality of active matrix conductive components. When enabled, the one or more display drivers is configured to transmit a first signal to the active matrix display in accordance with display operation. In addition, the touchscreen display includes one or more touch controllers coupled to one or more touch sensor conductors. Note that a touch sensor conductor includes one or more segments of the plurality of active matrix conductive components. When enabled, a touch controller of the one or more touch controllers is configured to transmit a second signal via the touch sensor conductor in accordance with touchscreen operation that is performed concurrently with the display operation.

The touchscreen operation and the display operation are performed concurrently within the touchscreen display. From certain perspectives, the touchscreen operation and the display operation may be viewed as being performed simultaneously within the touchscreen display such that both touchscreen operation and the display operation operate using many common elements of the touchscreen display (e.g., segmented portions of one or more ground plane conductors).

In some examples, the plurality of active matrix conductive components includes a common ground plane that is segmented into a plurality of segments including the one or more segments. A first touch sensor conductor includes a first subset of the plurality of segments and is aligned in a first direction (e.g., a row touch sensor conductor in a row direction), and a second touch sensor conductor includes a second subset of the plurality of segments that is different than the first subset of the plurality of segments and is aligned in a second direction that is different than the first direction (e.g., a column touch sensor conductor in a column direction). Note that a touch sensor conductor may alternatively be referred to as a touch sensor electrode. In general, a conductor may alternatively be referred to as an electrode or a metal line. In some examples, a common ground plane conductor is segmented into segments, and certain of those segments are appropriately connected together thereby forming different respective touch sensor conductors (e.g., a row touch sensor conductor formed using appropriately connected segments of a first set of segments of the segmented common ground plane conductor, and a column touch sensor conductor formed using appropriately connected segments of a second set of segments of the segmented common ground plane conductor).

When enabled, the one or more touch controllers is further configured to transmit a first touch sensor signal via the first touch sensor conductor and to transmit a second touch sensor signal via the second touch sensor conductor. In addition, when enabled, the one or more touch controllers is further configured to process the first touch sensor signal and/or the second touch sensor signal to detect interaction of an external conductor with the touchscreen display. Note that a change of capacitance of the first touch sensor conductor and/or the second touch sensor conductor is based on the external conductor.

In addition, in some examples, the touchscreen display includes a first plurality of touch sensor conductors including the first touch sensor conductor aligned in the first direction and a second plurality of touch sensor conductors including the second touch sensor conductor aligned in the second direction. For example, a first row touch sensor conductor is formed using appropriately connected segments of a first set of segments of the segmented common ground plane conductor, a second row touch sensor conductor is formed using appropriately connected segments of a second set of segments of the segmented common ground plane conductor, a third row touch sensor conductor is formed using appropriately connected segments of a third set of segments of the segmented common ground plane conductor, and so on.

Similarly, a first column touch sensor conductor is formed using appropriately connected segments of a fourth set of segments of the segmented common ground plane conductor, a second column touch sensor conductor is formed using appropriately connected segments of a fifth set of segments of the segmented common ground plane conductor, a third column touch sensor conductor is formed using appropriately connected segments of a sixth set of segments of the segmented common ground plane conductor, and so on.

In some examples, when enabled, the one or more touch controllers is configured to identify a location of the interaction of the external conductor with the touchscreen display based on an intersection of the first touch sensor conductor and the second touch sensor conductor within the touchscreen display.

In some examples, note that the first touch sensor conductor and/or the second touch sensor conductor includes a channel width in a range of 3-10 millimeters. Also, in some examples, note that the second signal includes a sine wave signal, a compound sine wave signal, an alternating current (AC) signal, and/or a pulsed square wave signal.

In some examples, the touch controller of the one or more touch controllers is capacitively coupled to the touch sensor conductor via a touch controller line. In other examples, the touch controller of the one or more touch controllers is directed connected to the touch sensor conductor.

Also, in some examples, the one or more display drivers and/or the one or more touch controllers of the touchscreen display are implemented within one or more integrated circuits.

Also, in certain examples, when enabled, the one or more touch controllers is further configured to transmit the second signal via the touch sensor conductor and also detect change of the second signal via the touch sensor conductor in accordance with a self-capacitive mode. Also, when enabled, the one or more touch controllers is further configured to detect a third signal via the touch sensor conductor in accordance with a mutual-capacitive mode, wherein the third signal is coupled to the touch sensor conductor from another touch sensor conductor.

Also, in some examples, a method for execution within a touchscreen display includes operating one or more display drivers that is coupled to an active matrix display via a plurality of active matrix conductive components to transmit a first signal to the active matrix display in accordance with display operation. Such a method also includes operating one or more touch controllers that is coupled to one or more touch sensor conductors including operating a touch controller of the one or more touch controllers to transmit a second signal via a touch sensor conductor that includes one or more segments of the plurality of active matrix conductive components in accordance with touchscreen operation that is performed concurrently with the display operation.

FIG. 12 illustrates a flowchart for a concurrent touchscreen display device performing touch operation processing using a mutual-capacitive mode in accordance with various embodiments. In a mutual-capacitive mode, a first touch controller transmits the transmit signal and a second touch controller receives and monitors the transmit signal. An exemplary method 1200 includes the following steps. First step 1201 comprises generating a transmit signal for transmission to the active matrix conductive pathways 222, 232. The transmit signal is continuously generated in step 1202. The capacitance coupling combined with the resistance to ground in the active matrix driver creates a high pass filter. If the transmit signal is DC, it will not be coupled onto the active matrix conductors, such as the first set of multiple conductive pathways 222 and the second set of multiple conductive pathways 232. In step 1203, the transmit signal is coupled onto the matrix conductor group, however it may be severely attenuated by the high pass filter if the resistance to ground is too low. Once the transmit signal is coupled to the matrix conductor, as shown in step 1204, it propagates through the first matrix conductor group 331. The transmit signal capacitively couples from the first matrix conductor group to the second matrix conductor group 1205. If the normal capacitance of between the two conductor groups is altered by the presence of an external conductive material (e.g., finger, pen) on or near the surface of the display, the transmit signal is altered 1206. Once the potentially altered transmit signal is coupled to the second matrix conductor group 1207, it propagates through the second matrix conductor group 321. Once the transmit signal reaches the capacitive coupling point at the second touch controller, it couples to the touch controller conductor 1208. If the resistance to ground in the active matrix driver for this conductor group is too low, the transmit signal may be significantly attenuated. At step 1209, the received transmit signals are evaluated to determine if a detectable signal is present. If no signal is detected, the device keeps monitoring for a detectable signal. While there is a detectable transmit signal 1211, it is processed 1210 to determine if the capacitance has changed sufficiently to indicate the presence of an external conductive element (e.g., finger, pen, etc.) near the capacitance coupling area between the first and second matrix conductor groups. Mutual capacitance information provides unique capacitance values for every capacitance coupling between the matrix conductor groups. Note that there are a number of different methods, approaches, algorithms, etc. for creating unique row or column information with a capacitive touch sensor (e.g., scanning one or more rows at a time, unique signals on each row, etc.). Mutual capacitance information allows the identification of multiple simultaneous human touches or conductive pen locations.

FIG. 13 illustrates a flowchart of a concurrent touchscreen display device performing touch operation processing using a self-capacitive mode in accordance with various embodiments. In the self-capacitive mode, the touch controller uses the conductive pathway as a bidirectional signal line. The touch controller transmitting the transmit signal is the same touch controller that receives and monitors the transmit signal. An exemplary method 1300 includes the following steps. First, generating a transmit signal for transmission to the active matrix 1301. The transmit signal is continuously generated 1302. The capacitance coupling combined with the resistance to ground in the active matrix driver creates a high pass filter. If the transmit signal is DC, it will not be coupled onto the active matrix conductors. The transmit signal is coupled onto the matrix conductor group 1303, however it may be severely attenuated by the high pass filter if the resistance to ground is too low. Once the signal is coupled to the matrix conductor, as shown in step 1304, it propagates through a matrix conductor group, such as the first matrix conductor group 331. If the normal capacitance of the first matrix conductor group is altered by the presence of an external conductive material (e.g., finger, pen, etc.) that is coupled to earth ground, on or near the surface of the display, the transmit signal is altered 1305. The potentially altered signal propagates back through the first matrix conductor group 331. Once the transmit signal reaches the capacitive coupling point back at the first touch controller, it couples to the touch controller conductor 1307. If the resistance to ground in the active matrix driver for this conductor group is too low, the signal may be significantly attenuated. At step 1308, the received signals are evaluated to determine if a detectable signal is present. If no signal is detected, the device keeps monitoring for a detectable signal. While there is a detectable signal 1310, it is processed 1309 to determine if the capacitance has changed sufficiently to indicate the presence of an earth ground coupled external conductive material (e.g., finger, pen, etc.) at the capacitance coupling area between the first and second matrix conductor groups. This method is replicated on all matrix conductor groups. Self capacitance information is good for the detection of a single finger, single pen or to be used to provide additional information to help in filtering out erroneous touches (e.g., salt water on display, palm rejection, etc.).

For both the self-capacitive mode and the mutual-capacitive mode, a touch controller monitors the effect caused by change in capacitance, such as by monitoring changes in voltage, current, or phase delay. Many standard techniques may be used to monitor the change in capacitance. In some examples, the touch controller function utilized in the connection architecture described uses transmit signals that are not filtered by the capacitive coupling. It is desirable to make the capacitor formed at an intersection of the touch channel conductors and the group of active matrix traces as large as practical as the signal strength of the coupled signal increases as the value of the capacitance increases.

Capacitive coupling is also basic to band pass filters. The capacitive coupling of the touch controller function to the conductive pathways in an active matrix display could also be configured to provide band pass filter functions to reject frequencies and simplify the filtering functions within the touch controller. FIG. 14A illustrates the definition of a band pass filter. FIG. 14B illustrates the components added to the touch controller to create the band pass filter. FIG. 14C illustrates the touch controller, with band pass filter, coupled to a group of active matrix conductors. Note that any of a number of different types of coping operations may be performed in accordance with processing signals in accordance with touchscreen display operations as described herein. For example, bandpass filtering may be performed in addition to or alternatively to low pass filtering, high pass filtering, etc.

FIG. 15 shows a three-dimensional (3D) view of a concurrent touchscreen display device 1500 implementing one method for capacitively coupling the touch controller functions into the row and column display driver chips. The touchscreen display device 1500 comprises an active matrix display 210 having a grid of multiple row conductors 1511 (first set of conductors) and multiple column conductors 1512 (second set of conductors), an active matrix column driver 1520 coupled to the multiple column conductors 1512, and an active matrix row driver 1530 coupled to the multiple row conductors 1511, all of which are disposed on an active matrix display substrate 1540. The active matrix column driver 1520 has an integrated touch controller, and the active matrix row driver 1530 also has an integrated touch controller. The integrated touch controller of the active matrix column driver 1520 is capacitively coupled to the multiple active matrix column conductors 1512 via touch controller touch lines 1521. A first dielectric layer 1550 separates the touch controller column touch lines 1521 from the active matrix column conductors 1512. Similarly, the integrated touch controller of the active matrix row driver 1530 is capacitively coupled to the multiple active matrix row conductors 1511 via touch controller row touch lines 1531. A second dielectric layer 1551 separates the active matrix row conductors 1511 from the touch controller row touch lines 1531.

Moreover, the concurrent touchscreen display device 1500 described in FIG. 15 can also be fabricated using various stack configurations, examples of which are illustrated in FIGS. 16A-16D.

FIG. 16A shows an exemplary stack layer comprising a substrate 1610 (e.g., in some examples, which may be a glass layer, a ruggedized plastic material, and/or any other appropriate protective and/or dielectric material, etc.), row conductors 1620 disposed on the substrate 1610, touch lines 1630 disposed on the substrate, a first dielectric layer 1640 disposed on the touch lines 1630 and the row conductors 1620 in contact with the substrate 1610 and separating the touch lines 1630 from the row conductors 1620. The stack further comprises column conductors 1650 disposed on the first dielectric layer 1640, and a second dielectric layer 1660 disposed on the column conductors 1650. This stack configuration makes use of existing metal layers by locating the touch lines 1630 in the same layer as the row conductors 1620, where the touch lines 1630 are capacitively coupled to the column conductors 1650. FIG. 16B is similar to the FIG. 16A, except the perspective of the layer stackup is orthogonal to FIG. 16A. FIG. 16B shows the touch lines 1670 are located in the same layer as the column conductors 1650, and the signal lines are capacitively coupled to the row conductors 1620.

FIG. 16C shows an exemplary stack layer comprising a substrate 1610, row conductors 1620 disposed on the substrate 1610, a first dielectric layer 1640 disposed on the row conductors 1620, column conductors 1650 disposed on the first dielectric layer 1640, a second dielectric layer 1660 disposed on the column conductors 1650 and in contact with the first dielectric layer 1640, touch lines 1680 disposed on the second dielectric layer 1660. In this exemplary embodiment, the touch lines 1680 are located in a layer separate from, and above, the column conductors 1650 and the row conductors 1620. The touch lines 1680 are located over the column conductors 1650 and offset from the row conductors 1620, such that the touch lines 1680 are capacitively coupled to the column conductors 1650. FIG. 16D is similar to FIG. 16C, except the perspective of the layer stackup is orthogonal to FIG. 16C. FIG. 16D shows the touch lines 1690 are located in a layer separate from, and below, the row conductors 1620 and the column conductors 1650. As used herein, "below" describes a layer closer to the substrate 1610 layer and "above" describes a layer farther from the substrate layer 1610. Furthermore, FIGS. 16A, 16N, 16C and 16D may also apply to embodiments where the row conductors and column conductors are fabricated in a different order, with other layers above, below or under the row and column conductors. The touch lines can be either above or below both the row and column conductors with one or more other layers in between so long as the capacitance created by the overlap is sufficient.

FIG. 17 shows a 3D view of a concurrent touchscreen display device 1700 in which one set of the touch functions are capacitively coupled to a column driver 1720 and a row touch controller 1731 is directly connected to a segmented ground plane 1760. The touchscreen display device 1700 is similar to the touchscreen display device 1500. The integrated touch controller of the active matrix column driver 1720 is capacitively coupled to the multiple column conductors 1712 via touch controller touch lines 1721.

A first dielectric layer 1750 separates the touch controller touch lines 1721 from the column conductors 1712. However, the touchscreen display device 1700 comprises two or more segmented ground plane conductors 1760 disposed below the row conductors 1711. Each segmented ground plane 1760 is directly connected to a row touch conductor 1731. A touch occurring within the area of a segmented ground plane 1760 will create a change of capacitance detected by the corresponding row touch conductor 1731. The precision of locating a touch operation within the multiple rows of the active matrix display depends on the number and dimensions of the segmented ground planes 1760. Smaller ground planes 1760 result in more precision location determinations, whereas larger ground planes 1760 cover more area and are less precise in comparison.

Moreover, in various embodiments, the row driver 1730 can be the driver being capacitively coupled to the row conductors 1711, and the column driver 1720 can be the driver directly connected to various segmented ground planes via corresponding touch conductors. Note that the conductors portrayed in the diagram are separated by appropriate dielectric layers, even if not specifically shown. In general, any combination of direct connectivity, capacitively coupling (CC), etc. may be made, respectively, between one or more drivers and the appropriate one or more segments of the various segmented ground planes.

Note that the various aspects, embodiments, and/or examples of the invention (and/or their equivalents) are not limited to the use of a specific set of conductors within the active matrix display stack, but rather may be implemented to utilize any available set of conductors that provide effective channels of conductive traces with sufficient capacitance at their intersections.

Additional disclosure is now provided for explanation and understanding of the design of an exemplary touch device, such as concurrent touchscreen display devices 400, 500, 550, 1500, 1700.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The use of terms such as rows or columns are intended to be logical and not necessarily physical in nature. The use of the term active matrix display or flat panel display comprise a large number of display technologies and configurations, including LCD, OLED, EL, Plasma, Quantum Dot, etc. Any display technology that has conductive pathways that change capacitance in the presence of an external conductive material (e.g., finger, pen, etc.) on the user or viewer facing surface of the display can be used. Any configuration of conductive pathways that can be formed into logical rows and columns either by layout or by connecting conductive traces off screen can be used, such as traditional two layer rows and columns of conductors, single layer touch sensor layouts, in-cell and on-cell touch sensor configurations can be used.

Note that any of a variety of different respective touch controller methodologies and operations may be used in accordance with the various aspects, embodiments, and/or examples of the invention (and/or their equivalents). The signaling techniques that may be employed herein can be varied including Time Division Multiplexing (TDM), Frequency Division Multiplexing (FDM), Code Division Multiplexing (CDM), etc., any combination thereof, and/or other signaling approaches. In addition, a variety of modulation techniques may also be utilized, such as frequency modulation and direct-sequence spread spectrum modulation. The range of frequencies which may be utilized is only limited by the filtering inherent in the circuitry, the size of the display (i.e. resistance and capacitance) and any need there may be to minimize any interference with the operation of the display FIG. 18 is a schematic block diagram of an embodiment 1800 of a liquid crystal display (LCD) pixel layout in accordance with the present invention. From left to right, this LCD pixel layout includes a red sub-pixel, green sub-pixel, and a blue sub-pixel, thereby forming an RGB group (e.g., shown with respect to reference numerals 1820, 1822, and 1824) that is operable to emit light of various colors depending on the respective combination of RGB. The use of rectangles to depict the shape of the respective sub-pixels is for illustrative purposes only, actual shapes and arrangements of the sub-pixels may vary and be of any desired shape. A common ground plane conductor 1810 is also implemented that is shared by each of the respective RGB sub-pixels. Note that different configurations of RGB sub-pixels may alternatively be implemented (e.g., such that the RGB are in different orders from left to right, alternatively not necessarily aligned first second and third, possibly in a triangular configuration, etc.). In general, LCD pixel layout includes respective light sources and color filters operative to emit light of various colors depending on the respective combination of RGB.

FIG. 19 is a schematic block diagram of another embodiment 1900 of LCD pixels with a segmented ground plane in accordance with the present invention. Comparing this diagram to FIG. 20, connectivity of the common ground plane conductor 1910 associated with all of the pixels and/or sub-pixels (e.g., an instantiation of RGB sub-pixels is shown with respect to reference numeral 1920) shown herein is maintained. In some examples, this pattern is replicated multiple times such as in accordance with a checkerboard type pattern. Different respective replicated segments of the segmented common ground plane within an active matrix display may be alternatingly connected to form respective conductors that are associated with the touchscreen rows and the touchscreen columns such as is shown within FIG. 24.

FIG. 20 is a schematic block diagram of an embodiment 2000 of LCD pixels with a segmented ground plane in accordance with the present invention. In this diagram, two different common ground plane conductors 2010 and 2015 are implemented among a number of LCD pixels, each having respective RGB sub-pixels (e.g., an instantiation of RGB sub-pixels is shown with respect to reference numeral 2020). For example, within the outer portion of the diagram and around the respective LCD pixels thereof, a lighter shaded first common ground plane conductor 2010 is implemented and the respective portions thereof are used to form at least a portion of a first conductor of a touch sensor (e.g., at least a portion of a first row conductor of a touch sensor).

In addition, within the inner portion of the diagram and around the respective LCD pixels thereof, a darker shaded second common ground plane conductor 2015 is implemented and the respective portions thereof are used to form at least a portion of second conductor of a touch sensor (e.g., at least a portion of a first column conductor of a touch sensor). Note that the respective first common ground plane conductor in the second common ground plane conductor encompass multiple respective pixels each. In other embodiments of a segmented ground plane, the ground plane may not be coplanar with or surrounding pixels or sub-pixels, but may be on a different layer of the display stack, such that each ground plane segment may be "contiguous" (e.g., unpatterned).

Within a touch sensor implemented to detect interaction from user (e.g., contact from a human finger, or a stylus, or an electronic pen (e.g., e-pen), etc.), a granularity needed to detect such interaction from the user is typically much less than the spacing between respective pixels and/or sub-pixels within display. As such, the common ground plane conductor portions associated with multiple respective pixels and/or sub-pixels within the display may be used to form the respective portions of conductors within the touch sensor. Note that different respective portions of the common ground plane conductor portions as shown in this diagram are connected appropriately with other similar portions to form different respective conductors within the touch sensor. In some examples, a first group of conductors are aligned in a first direction (e.g., such as being rows of the touch sensor), and a second group of conductors are aligned in a second direction (e.g., such as being columns of the touch sensor). Note that the respective conductors may be implemented using different shapes, sizes, widths, etc. and maybe implemented in a variety of different patterns including on Manhattan pattern, a diamond shaped pattern, and/or other shapes and formats.

FIG. 21 is a schematic block diagram of an embodiment 2100 of segmentation of a common ground plane within an active matrix in accordance with the present invention. Considering this diagram relative to the prior diagram in which there are two respective common ground plane conductor portions 2110 and 2115, one being composed of the common ground plane conductor portions within the outer portion of the pixels and/or sub-pixels (e.g., such as with reference to FIG. 20), and another being composed of the common ground plane conductor portions inner portion 2115 within the inner portion of the pixels and/or sub-pixels (e.g., such as with reference to FIG. 20), the different respective portions may be appropriately connected to form different respective conductors of the touch sensor.

In this diagram, with respect to an overall common ground plane 2105 within an active matrix display that is segmented, a certain number of outer portions are connected together to form a conductor corresponding to a touchscreen row. As can be seen, this diagram shows multiple respective conductors corresponding to multiple respective touchscreen rows 2121. Within the respective touchscreen rows, the common ground plane conductor portions inner portion 2115 within the inner portion of the pixels and/or sub-pixels (e.g., such as with reference to FIG. 20) are connected together to form a conductor corresponding to a touchscreen column.

For example, also with reference to FIG. 20, the common ground plane of an active matrix display is patterned into different respective conductive areas. The common ground plane within the active matrix display 2105 is segmented into different conductive areas. Appropriate connectivity of the different respective segments of the common ground plane of the active matrix display segments is made to form respective conductors that are associated with the touchscreen rows 2121 and the touchscreen columns 2123.

FIG. 22 is a schematic block diagram of an embodiment 2200 of segmentation of a common ground plane 2205 to form a touch sensor in accordance with the present invention. In this diagram, a common ground plane of the display is segmented into blocks that are connected into rows and columns.

This diagram shows an implementation of FIG. 21, in that, inner and outer portions of common ground plane conductor sections are used such as in accordance with the representation FIG. 20. For example, within a particular cross-section, a first common ground plane conductor segment is composed of the outer portion thereof, and a second common ground plane conductor segment is composed of the inner portion thereof.

However, in this diagram, where a dot is shown (e.g., reference numeral 2203), there is a corresponding via connecting the corresponding metal traces (e.g., reference numeral 2207 for a row and 2208 for a column) to the common ground plane conductive areas. For example, on the left-hand side of the diagram, three respective rows are connected thereby forming a singular touchscreen row (e.g., shown as TS Row 1 in the diagram). In other words, along those three horizontal lines, where there is a dot, there is a corresponding via connecting the corresponding metal traces to the common ground plane conductor areas. Similarly, there are three other respective rows of segments that are connected thereby forming another singular touchscreen row (e.g., shown as TS Row 2 in the diagram). Note that there are two respective touchscreen rows depicted in this diagram (e.g., a break/segmentation in ground plane between two adjacent rows is noted on the right-hand side of the diagram, such as with respect to reference numeral 2209)

Analogously, in the vertical direction, using the inner portions of the common ground plane conductor sections are appropriately connected to form different respective touchscreen columns. For example, on the left-hand side of the diagram, three respective columns are connected thereby forming a singular touchscreen column (e.g., shown as TS Column 1 in the diagram). In other words, along those three horizontal lines, where there is a dot, there is a corresponding via connecting the corresponding metal traces to the common ground plane conductor areas. Similarly, there are three other respective rows of segments that are connected thereby forming other singular touchscreen columns (e.g., shown as TS Column 2, TS Column 3, TS Column 4 in the diagram). Note that there are four respective touchscreen rows depicted in this diagram.

Note that the metal traces are expected to be located at the gate and data metal layers of the active matrix display with reference to this diagram. Again, with respect to this diagram and any other diagram herein, note that any desired format and shape of different respective segments of an active matrix common ground plane (e.g., of any desired size, shape, form, connectivity, etc.) may be made, and those respective segments of the active matrix common ground plane may be appropriately connected to form the different respective conductors associated with a touch sensor that is implemented within the display device (e.g., forming row and column conductors are one example).

FIG. 23 is a schematic block diagram of an embodiment 2300 of a 3D layout of a concurrent touchscreen display device (e.g., such as with reference to FIG. 22), with the touch controllers directly connected to segmented plane segments using vias to metal lines in accordance with the present invention.

This diagram shows the touch controller integrated into an active matrix row and column driver and directly connected to various conductive elements of the segmented ground plane. The touchscreen display device is implemented based on an active matrix display substrate 2340 and includes a segmented ground plane conductor 2360.

An active matrix column driver including touch controller 2320 is implemented to operate the active matrix display using active matrix column conductors 2312. An active matrix row driver including touch controller 2330 is implemented to operate the active matrix display using active matrix row conductors 2311.

In this diagram, the segmented ground plane conductor 2360 is segmented to form rows and columns such that the columns are formed by inner portions of different respective segments of the segmented ground plane conductor 2360 that are connected together, and rows are formed by outer portions of different respective segments of the segmented ground plane conductor 2360 that are connected together.

In this particular example, touchscreen (TS) Y dimension conductors 2392 are formed by appropriately connecting different respective segments of the segmented ground plane conductor 2360. X dimension conductors 2391 are formed by the remaining outer portion around each Y dimension conductors 2392 of the segmented ground plane conductor 2360.

In this diagram, new/additional lines are provided in parallel to the gate and data lines and are connected, using vias, to the appropriate segments of the segmented ground plane conductor 2360 (e.g., which may be implemented using ITO or other appropriately selected material).

The touch controller implemented within the active matrix row driver including touch controller 2330 is directly connected to the appropriate portions of the segmented ground plane using vias connected to the X dimension conductors 2331. Similarly, the touch controller implemented within the active matrix column driver including touch controller 2320 is directly connected to the appropriate portions of the segmented ground plane using vias connected to the Y dimension conductors 2332.

Note that in a typical LCD type display, metal lines are used to provide connectivity for the TFT (gate and data lines). FIG. 23 shows an implementation that does not use Active Matrix Row conductors 2311 or Active Matrix Column conductors 2312 for connectivity to the rows and columns of the touch sensor. In FIG. 23, new/additional lines, the X dimension conductors 2331 and the Y dimension conductors 2332, are implemented in parallel to the Active matrix Row conductors 2311 and the Active Matrix Column conductors 2312 that are connected to the appropriate segments of the segmented ground plane conductor 2360 using vias.

The example of this diagram uses the segmented ground plane for both row and column conductors within a given plane of the stackup that are appropriately connected using additional lines that are implemented in another respective plane of the stackup and are connected to the appropriate segments of the segmented ground plane conductor 2360 using vias connected to metal lines.

FIG. 24 is a schematic block diagram of an embodiment 2400 of segmentation of a common ground plane within an active matrix in accordance with the present invention. From certain perspectives, this diagram may be viewed with reference to FIG. 19. On the left-hand side of the diagram is a 4×4 cross section 2410 showing 16 respective replicated segments of the segmented common ground plane within an active matrix display. There are 16 alternating segments of the segmented common ground plane within the active matrix display in the 4×4 cross section on the left-hand side of the diagram. Half of the 16 alternating segments are connected to form at least a portion of a conductor of the touch sensor, and the other half of the 16 alternating segments are connected to form at least a portion of another conductor of the touch sensor.

On the right-hand side of the diagram, the 4×4 cross section is shown as being repeated multiple times. Any desired number of segments associated with the base 4×4 cross section on the left-hand side of the diagram may be used to implement different respective conductors of different respective widths, sizes, shapes, etc.

In general, know that different respective segments of the overall segmentation of a common ground plane within an active matrix display may be made to form different respective portions/segments of any desired shapes, sizes, etc., and those respective portions/segments may be appropriately connected to form conductors to be used within a touch sensor having any desired shapes, sizes, widths, etc.

FIG. 25 is a schematic block diagram of an embodiment 2500 of an in-cell checkerboard sensor layout in accordance with the present invention. This diagram shows an in-cell checkerboard square sensor layout. In some examples, the different respective segments of the common ground plane within an active matrix display include approximate 1 mm×1 mm squares. Note that segments of any other size may alternatively be used. Note also that some embodiments may include segments such that at least two different segments are of different size and/or shape.

Alternating square segments of a conductive ground plane within an active matrix display are connected to one another thereby forming different respective conductors of the touch sensor. For example, the reader is referred to FIG. 26 showing dots to indicate where there is connectivity to the respective conductive ground plane segment using a corresponding via connected to a metal line. In this diagram, vias connected to metal lines may similarly be implemented with respect to each of the different respective square segments of the common ground plane within the active matrix display to form the different respective conductors of the touch sensor (e.g., thereby forming different respective row conductors and column conductors).

For example, the cross sectional portion of the touch sensor depicted within this diagram shows 23 respective column conductors depicted by C1, C2 through C23 and 10 respective row conductors depicted by R1, R2 through R10.

With respect to this diagram and any other diagram, embodiment, example, etc., herein and their equivalents, note that the different respective conductors of a touch sensor may be implemented in any of a variety of ways. While many examples use row conductors aligned in a first direction and column conductors aligned in a second direction (e.g., such as with the second direction being perpendicular to the first direction), note that the different respective conductors may be aligned in any of a number of different ways. In general, any placement of sensor conductors in appropriate directions across the touchscreen display may be made to implement the touch sensor portion of the touchscreen display.

FIG. 26 is a schematic block diagram of an embodiment 2600 of an in-cell checkerboard sensor layout in accordance with the present invention. This diagram shows a cross-sectional portion of an in-cell checkerboard sensor layout, such as described and depicted with reference to FIG. 25, in more detail.

Alternating square segments of a conductive ground plane within an active matrix display are connected to one another thereby forming different respective conductors of the touch sensor. Dots associated with the different respective squares of the in-cell checkerboard sensor layout are used to indicate where there is connectivity to the respective conductive ground plane segment using a corresponding via.

In this diagram, within a 4×4 cross-sectional portion of the in-cell checkerboard sensor layout, 8 of the 16 respective square segments are connected to one another in accordance with a first conductor of the touch sensor, and the remaining 8 of the 16 square segments are connected to one another in accordance with a second conductor of the touch sensor. Considering an example implemented using 1 mm×1 mm ITO squares within a checkerboard layout, then each respective row and column of the touch sensor is approximately 4 mm wide. For example, considering the alternating implementation of the 4×4 cross-sectional portion of the in-cell checkerboard sensor layout, 8 of the 16 respective square segments are connected to one another in accordance with a conductor of the touch sensor that is approximately 4 mm wide. This is one example of a pattern that could be used. The common ground plane can be divided into different numbers of many different geometric shapes and sizes to create effective touchscreen displays, including designs or layout using an unequal number of segments in each dimension In one particular example, the metal conductor lines connecting the different respective segments of the conductive ground plane (e.g., which may be composed of indium tin oxide (ITO) (alternatively referred to as tin-doped indium oxide), or some other appropriate material having the desired electrical and optical characteristics and possibly other characteristics making it suitable for the particular application, such as being transparent within a touchscreen display, etc.). Also, the dots depict that vias connect metal lines to the different respective segments of the conductive ground plane.

This checkerboard implementation can improve the mutual capacitance of the touch sensor by a factor of two in some examples. For example, assuming an approximate 15 μm gap between the respective ITO segments/pads that are appropriately connected to form the respective conductors of the touch sensor, then along an approximate 32 mm linear edge of the 8 corresponding, respective ITO segments/pads, each being approximately 1 mm×1 mm in size, then the mutual capacitance of that linear edge is approximately 6.8 pF. In comparison, assuming an approximate 15 μm gap between the respective ITO segments/pads that are appropriately connected to form the respective conductors of the touch sensor, then along an approximate 16 mm linear edge of a 4 mm×4 mm ITO diamond shaped segment/pad, then the mutual capacitance of that linear edge is approximately 3.18 pF. As can be seen, implementing an in-cell checkerboard square sensor layout implementation can provide for an improved mutual capacitance compared to an in-cell diamond sensor layout implementation.

FIG. 27 is a schematic block diagram of an embodiment 2700 of an in-cell diamond sensor layout in accordance with the present invention. This diagram shows an in-cell diamond sensor layout. Alternating diamond segments of a conductive ground plane within an active matrix display are connected to one another thereby forming different respective conductors of the touch sensor. For example, where there is a dot, there is connectivity to the respective conductive ground plane segment using a corresponding via to a metal line. For example, the cross sectional portion of the touch sensor depicted within this diagram shows 15 respective column conductors depicted by C1, C2 through C15 and six respective row conductors depicted by R1, R2 through R6.

In one particular example, the metal conductor lines connecting the different respective segments of the conductive ground plane (e.g., which may be composed of indium tin oxide (ITO) (alternatively referred to as tin-doped indium oxide), or some other appropriate material having the desired electrical and optical characteristics and possibly other characteristics making it suitable for the particular application, such as being transparent within a touchscreen display, etc.). Also, the dots depict vias that connect the different respective segments of the conductive ground plane to a metal line. Note that the terms "conductive ground plane" and "metal lines" correspond to elements on different layers of the active matrix stack-up that not electrically connected, unless specified otherwise.

Note that different respective materials used to form the different respective segments of the touch sensor, and as such, different respective values of resistance, capacitance, etc. as a function of size, implementation, etc. of the touchscreen display may be realized.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touchscreen display comprising:
   one or more display drivers coupled to an active matrix display via a plurality of active matrix conductive components, wherein, when enabled, a display driver of the one or more display drivers is configured to transmit a first signal to an active matrix conductive component of the plurality of active matrix conductive components in accordance with display operation; and
   one or more touch controllers coupled to one or more touch sensor conductors, wherein, when enabled, a touch controller of the one or more touch controllers is configured to transmit a second signal to the active matrix conductive component of the plurality of active matrix conductive components in accordance with touchscreen operation that is performed concurrently with the display operation such that the active matrix conductive component of the plurality of active matrix conductive components is also a touch sensor conductor of the one or more touch sensor conductors.

2. The touchscreen display of claim 1, wherein:
the touchscreen operation that is performed concurrently with the display operation within an area of the active matrix display that includes the active matrix conductive component of the plurality of active matrix conductive components; and
the active matrix conductive component of the plurality of active matrix conductive components is operative simultaneously in accordance with the display operation based on the first signal and also in accordance with the touchscreen operation based on the second signal.

3. The touchscreen display of claim 1, wherein:
the plurality of active matrix conductive components includes a common ground plane that is segmented into a plurality of segments;
a first touch sensor conductor of the one or more touch sensor conductors includes a first subset of the plurality of segments and is aligned in a first direction; and
a second touch sensor conductor of the one or more touch sensor conductors includes a second subset of the plurality of segments that is different than the first subset of the plurality of segments.

4. The touchscreen display of claim 1, wherein:
the plurality of active matrix conductive components includes a common ground plane that is segmented into a plurality of segments;
a first touch sensor conductor of the one or more touch sensor conductors includes a first subset of the plurality of segments and is aligned in a first direction;
a second touch sensor conductor of the one or more touch sensor conductors includes a second subset of the plurality of segments that is different than the first subset of the plurality of segments and is aligned in a second direction that is different than the first direction; and
when enabled, the one or more touch controllers is further configured to:
transmit a first touch sensor signal via the first touch sensor conductor;
transmit a second touch sensor signal via the second touch sensor conductor; and
process at least one of the first touch sensor signal or the second touch sensor signal to detect a change of capacitance of at least one of the first touch sensor conductor or the second touch sensor conductor that is caused by interaction of an external conductor with the touchscreen display.

5. The touchscreen display of claim 4, wherein the external conductor includes a finger of a user, a pen, or a stylus.

6. The touchscreen display of claim 4, wherein at least one of the first touch sensor conductor or the second touch sensor conductor includes a channel width in a range of 3-10 millimeters.

7. The touchscreen display of claim 1, wherein the second signal includes at least one of a sine wave signal, a compound sine wave signal, an alternating current (AC) signal, or a pulsed square wave signal.

8. The touchscreen display of claim 1, wherein the touch controller of the one or more touch controllers is capacitively coupled to the touch sensor conductor of the one or more touch sensor conductors via a touch controller line.

9. The touchscreen display of claim 1 further comprising:
integrated circuitry that includes at least one of the one or more display drivers and at least one of the one or more touch controllers.

10. A touchscreen display comprising:
a display driver coupled to an electrode that simultaneously serves as an active matrix conductive component of an active matrix display and a touch sensor conductor, wherein, when enabled, the display driver is configured to transmit a first signal to the electrode in accordance with display operation; and
a touch controller also coupled to the electrode, wherein, when enabled, a touch controller of the touch controller is configured to transmit a second signal to the electrode in accordance with touchscreen operation.

11. The touchscreen display of claim 10, wherein the touchscreen operation is performed concurrently with the display operation such that the electrode simultaneously serves as the active matrix conductive component of a plurality of active matrix conductive components of the active matrix and also as the touch sensor conductor of one or more touch sensor conductors of the touchscreen display.

12. The touchscreen display of claim 11, wherein:
the plurality of active matrix conductive components includes a common ground plane that is segmented into a plurality of segments;
a first touch sensor conductor of the one or more touch sensor conductors includes a first subset of the plurality of segments and is aligned in a first direction;
a second touch sensor conductor of the one or more touch sensor conductors includes a second subset of the plurality of segments that is different than the first subset of the plurality of segments and is aligned in a second direction that is different than the first direction; and
when enabled, the one or more touch controllers is further configured to:
transmit a first touch sensor signal via the first touch sensor conductor;
transmit a second touch sensor signal via the second touch sensor conductor; and
process at least one of the first touch sensor signal or the second touch sensor signal to detect a change of capacitance of at least one of the first touch sensor conductor or the second touch sensor conductor that is caused by interaction of an external conductor with the touchscreen display.

13. The touchscreen display of claim 12, wherein the external conductor includes a finger of a user, a pen, or a stylus.

14. A method for execution by a touchscreen display, the method comprising:
operating a display driver of one or more display drivers coupled to an active matrix display via a plurality of active matrix conductive components to transmit a first signal to an active matrix conductive component of the plurality of active matrix conductive components in accordance with display operation; and
operating a touch controller of a one or more touch controllers coupled to one or more touch sensor conductors to transmit a second signal to the active matrix conductive component of the plurality of active matrix conductive components in accordance with touchscreen operation that is performed concurrently with the display operation such that the active matrix conductive component of the plurality of active matrix conductive components is also a touch sensor conductor of the one or more touch sensor conductors.

15. The method of claim 14 further comprising:

performing the touchscreen operation concurrently with the display operation within an area of the active matrix display that includes the active matrix conductive component of the plurality of active matrix conductive components, wherein the active matrix conductive component of the plurality of active matrix conductive components is operative simultaneously in accordance with the display operation based on the first signal and also in accordance with the touchscreen operation based on the second signal.

16. The method of claim 14, wherein:

the plurality of active matrix conductive components includes a common ground plane that is segmented into a plurality of segments;

a first touch sensor conductor of the one or more touch sensor conductors includes a first subset of the plurality of segments and is aligned in a first direction; and a second touch sensor conductor of the one or more touch sensor conductors includes a second subset of the plurality of segments that is different than the first subset of the plurality of segments.

17. The method of claim 14, wherein:

the plurality of active matrix conductive components includes a common ground plane that is segmented into a plurality of segments;

a first touch sensor conductor of the one or more touch sensor conductors includes a first subset of the plurality of segments and is aligned in a first direction;

a second touch sensor conductor of the one or more touch sensor conductors includes a second subset of the plurality of segments that is different than the first subset of the plurality of segments and is aligned in a second direction that is different than the first direction; and when enabled, the one or more touch controllers is further configured to:

transmit a first touch sensor signal via the first touch sensor conductor;

transmit a second touch sensor signal via the second touch sensor conductor; and process at least one of the first touch sensor signal or the second touch sensor signal to detect a change of capacitance of at least one of the first touch sensor conductor or the second touch sensor conductor that is caused by interaction of an external conductor with the touchscreen display.

18. The method of claim 17, wherein the external conductor includes a finger of a user, a pen, or a stylus.

19. The method of claim 17, wherein at least one of the first touch sensor conductor or the second touch sensor conductor includes a channel width in a range of 3-10 millimeters.

20. The method of claim 14, wherein the second signal includes at least one of a sine wave signal, a compound sine wave signal, an alternating current (AC) signal, or a pulsed square wave signal.

* * * * *